United States Patent [19]

Shimoda et al.

[11] Patent Number: 5,703,889
[45] Date of Patent: Dec. 30, 1997

[54] HIGH EFFICIENCY CODING SIGNAL PROCESSING APPARATUS WITH ERROR PROPAGATION INFLUENCE REDUCTION

[75] Inventors: Kenji Shimoda; Hitoshi Takeda, both of Yokohama, Japan

[73] Assignee: Kabushiki Kaisha Toshiba, Kawasaki, Japan

[21] Appl. No.: 355,828

[22] Filed: Dec. 14, 1994

Related U.S. Application Data

[63] Continuation of Ser. No. 891,952, Jun. 1, 1992, abandoned.

[30] Foreign Application Priority Data

Jun. 4, 1991 [JP] Japan ..................... 3-132999

[51] Int. Cl.$^6$ .............. H03M 13/00; G06F 11/00
[52] U.S. Cl. .................. 371/55; 371/37.1; 371/48
[58] Field of Search ................... 371/55, 48, 32, 371/37.1, 31, 37.2, 37.7; 358/133, 135, 136, 138, 141, 261.3, 426; 341/94; 364/737, 265.2, 265

[56] References Cited

U.S. PATENT DOCUMENTS

| | | | |
|---|---|---|---|
| 4,211,996 | 7/1980 | Nakamura | 371/37 |
| 4,345,272 | 8/1982 | Shirota | 358/21 |
| 4,807,033 | 2/1989 | Keesen et al. | 358/167 |
| 4,816,914 | 3/1989 | Ericsson | 358/133 |
| 4,829,522 | 5/1989 | Nishiguchi | 371/31 |
| 4,972,417 | 11/1990 | Sako et al. | 371/37.1 |
| 5,001,561 | 3/1991 | Haskell et al. | 358/133 |
| 5,034,965 | 7/1991 | Kato | 375/26 |
| 5,070,503 | 12/1991 | Shikakura | 371/37.1 |
| 5,130,993 | 7/1992 | Gutman et al. | 371/42 |
| 5,140,417 | 8/1992 | Tanaka et al. | 358/133 |
| 5,210,605 | 5/1993 | Zaccarin et al. | 358/133 |
| 5,305,332 | 4/1994 | Ozawa | 371/31 |
| 5,392,037 | 2/1995 | Kato | 341/67 |

FOREIGN PATENT DOCUMENTS

| | | |
|---|---|---|
| 0345871 | 12/1989 | European Pat. Off. . |
| 0436251 | 7/1991 | European Pat. Off. . |
| 0493128 | 7/1992 | European Pat. Off. . |
| 54-32240 | 3/1979 | Japan . |
| 2124690 | 5/1990 | Japan . |

OTHER PUBLICATIONS

NHK Giken R & D (NHK Technical Lab. R&D) No. 17 vol. 12, 1991 pp. 26–36.
Y. Ooba et al; Dec. 15, 1991 pp. 26–37 (No Translation in English).
International Conference on Consumer Electronics (ICCE) 1991 THPM 13 2 AStudy on Trick Plays for Digital VCR Yamamitsu et al, Jun. 6, 1991 pp. 261–265.
Nikkei Electronics 1190.10.15 (No. 511) "Unification of High Efficiency Coding Systems for Images" pp. 117–142 (No Translation in English).
IEEe vol. 35, No. 3, Aug. 1989 "An Esperimental Study for a Home–Use Digital VTR" Yamamitsu et al; Dec. 15, 1991 pp. 450–457.

(List continued on next page.)

Primary Examiner—Robert H. Beausoliel, Jr.
Assistant Examiner—Trinh L. Tu
Attorney, Agent, or Firm—Cushman Darby & Cushman IP Group of Pillsbury Madison & Sutro LLP

[57] ABSTRACT

According to a high efficiency coding signal processing apparatus of the present invention, in order to suppress error propagation, effectively correct errors, and reduce a signal deterioration upon repetitive coding processing, a bit rate reduction circuit quantizes a video signal and outputs the resultant signal to low-and high-frequency encoders. A first transmission sequence packet circuit outputs low-frequency components at a predetermined period. A second transmission sequence packet circuit sequences and outputs high-frequency components. Since the low-frequency components and the high-frequency components are separately sequenced and transmitted, the low-frequency components are free from the influence of errors caused in the high-frequency components.

4 Claims, 31 Drawing Sheets

OTHER PUBLICATIONS

Patent Abstracts of Japan, vol. 15, No. 147 (E-1055) 12 Apr. 1991 & JP-A-3 022 735 (Matsushita Electronic Ind. Co., Ltd.) *abstract*.

Patent Abstracts of Japan, vol. 15, No. 453 (E-1134) 18 Nov. 1991 & JP-A-31 91 676 (Toshiba Corp.) *abstract*.

Del Pero et al, "Criteria for the Protection of the Video Information in a Codec Based on a DCT", Signal Processing of HDTV, II, Sep. 1989, pp. 769-776.

Aartsen et al, "Error Resilience of a Video Codec for Low Bitrates", Proceedings of ICASSP 1988 Apr. 1988, New York, pp. 1312-1315.

Yamamitsu et al, "An Experimental Study for a Home-Use Digital VCR", IEEE Transctions on Consumer Electronics, vol. 35, No. 3, Aug. 1989, pp. 450-457.

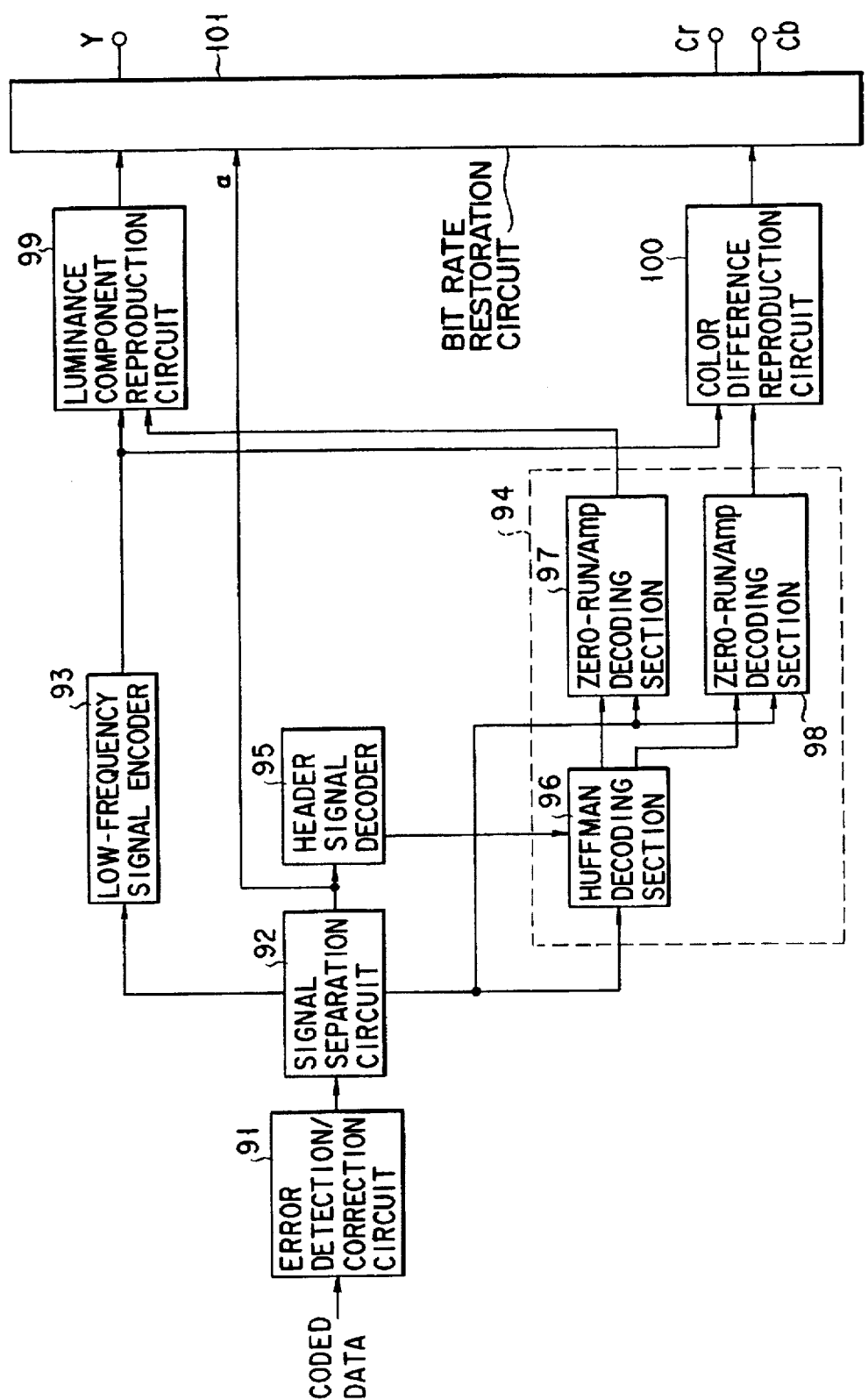
F I G. 4

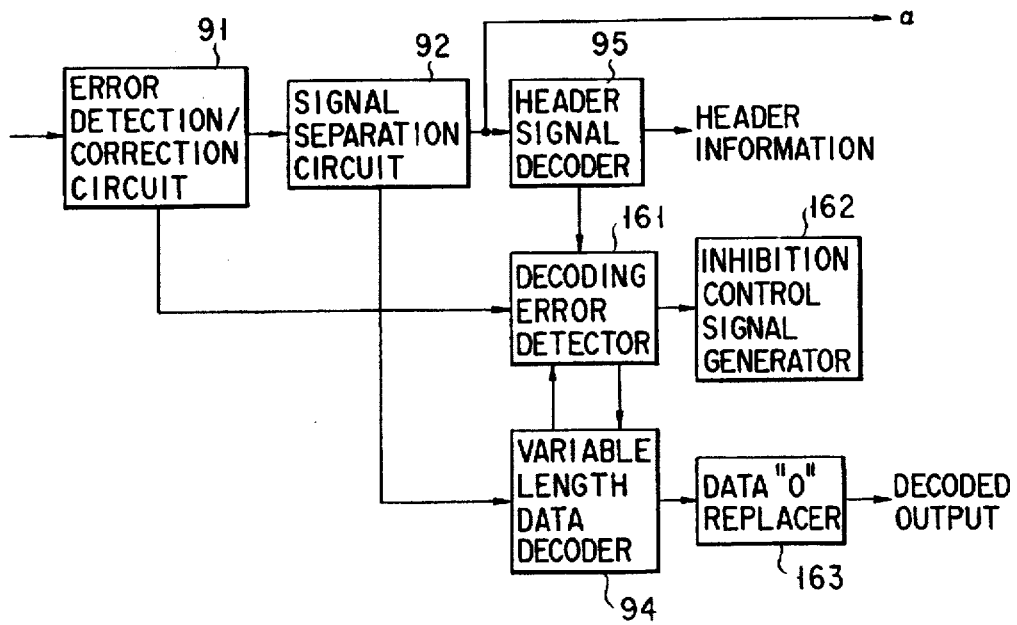
F I G. 13
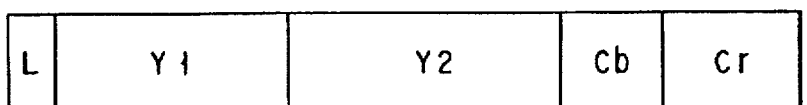
F I G. 14A
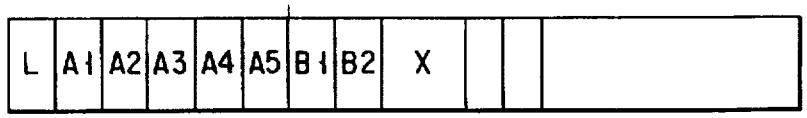
F I G. 14B

| DC$_A$ | A1 | A5 | 0 |
|---|---|---|---|
| A2 | A4 | 0 | 0 |
| A3 | 0 | 0 | 0 |
| 0 | 0 | 0 | 0 |
FIG. 15A
| DC$_B$ | B1 | 0 | 0 |
|---|---|---|---|
| 0 | 0 | 0 | 0 |
| 0 | 0 | 0 | 0 |
| 0 | 0 | 0 | 0 |
FIG. 15B
FIG. 16A MACRO-BLOCK DATA
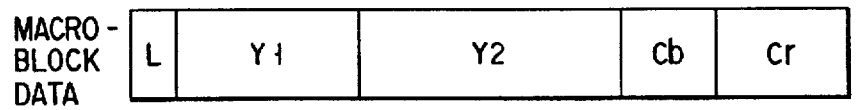
FIG. 16B ERROR FLAG
FIG. 16C DATA STRING
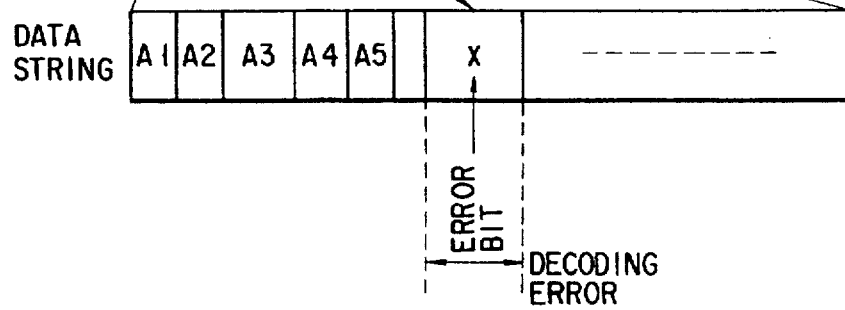

F I G. 17A    F I G. 17B
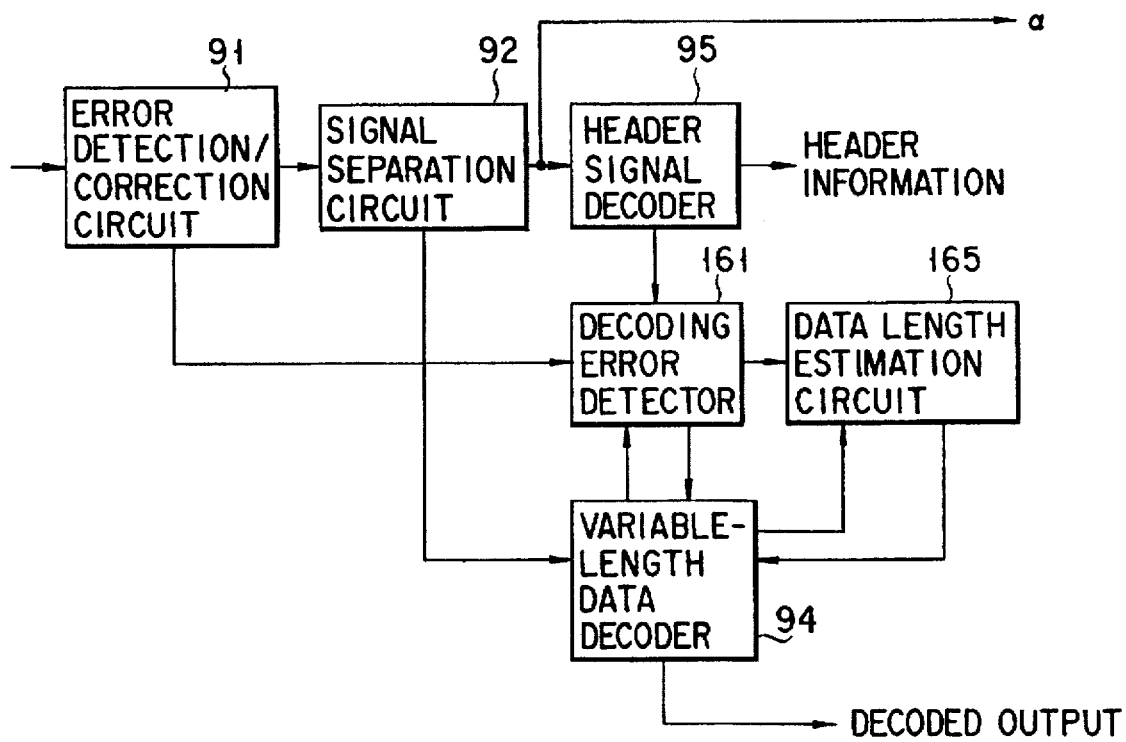
F I G. 18

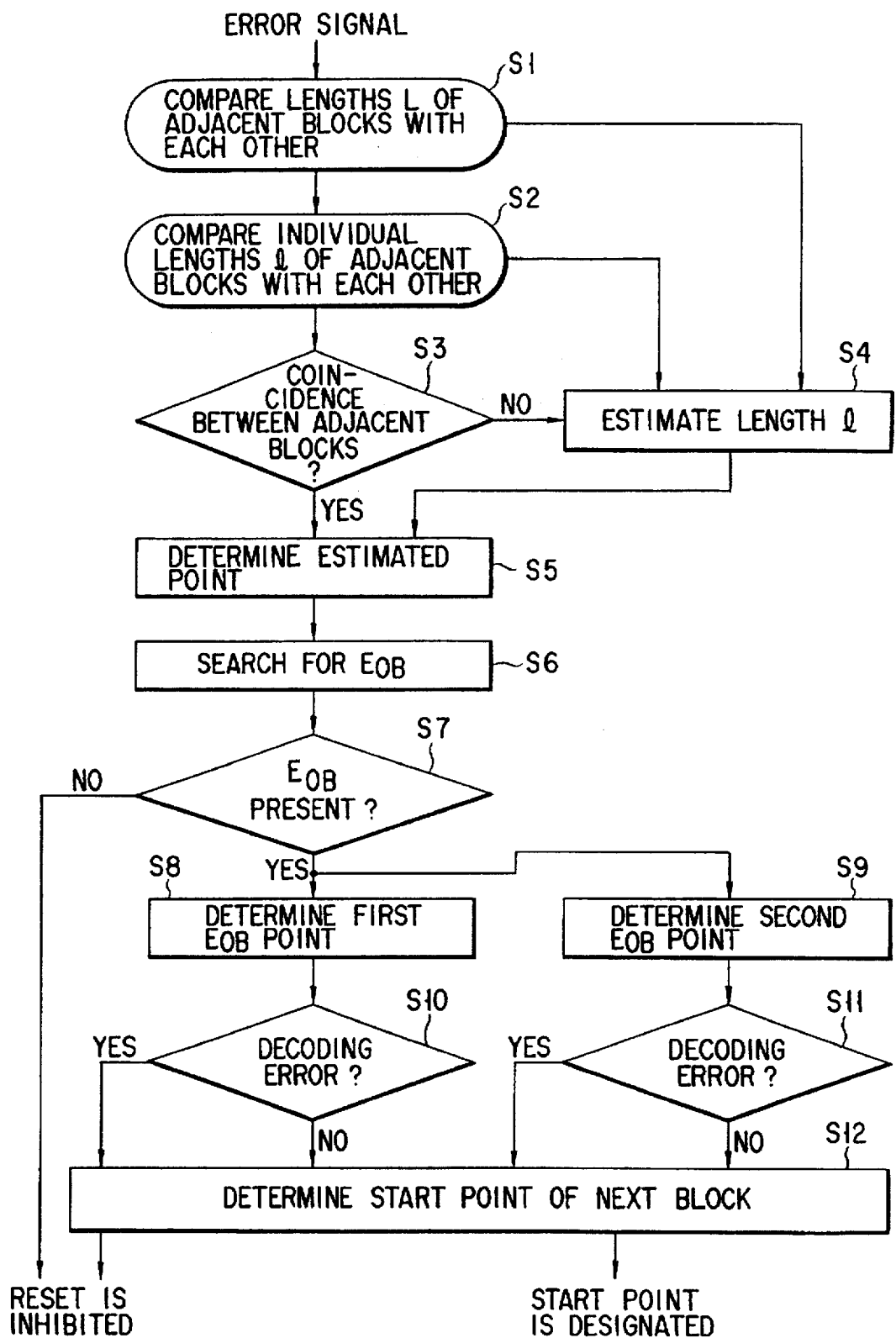
F I G. 20

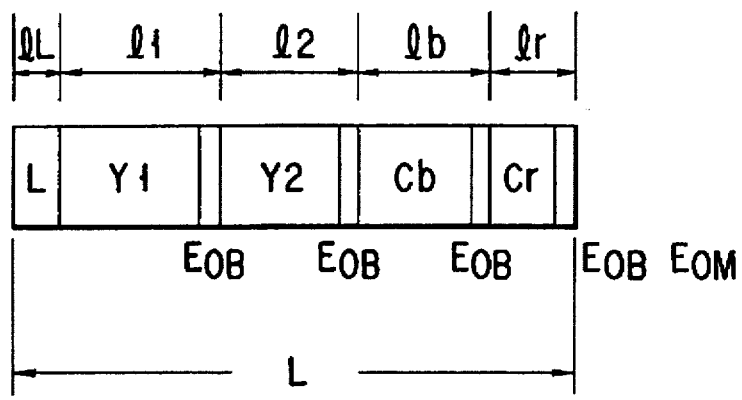
F I G. 22
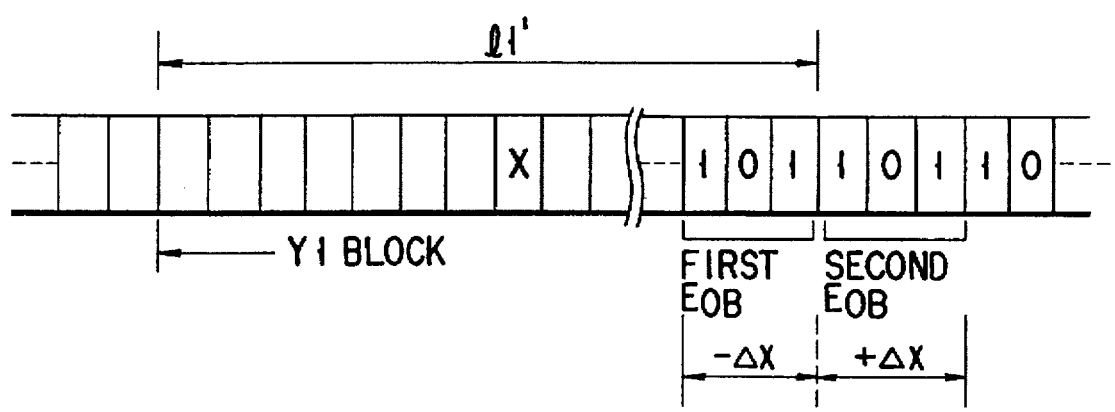
F I G. 23

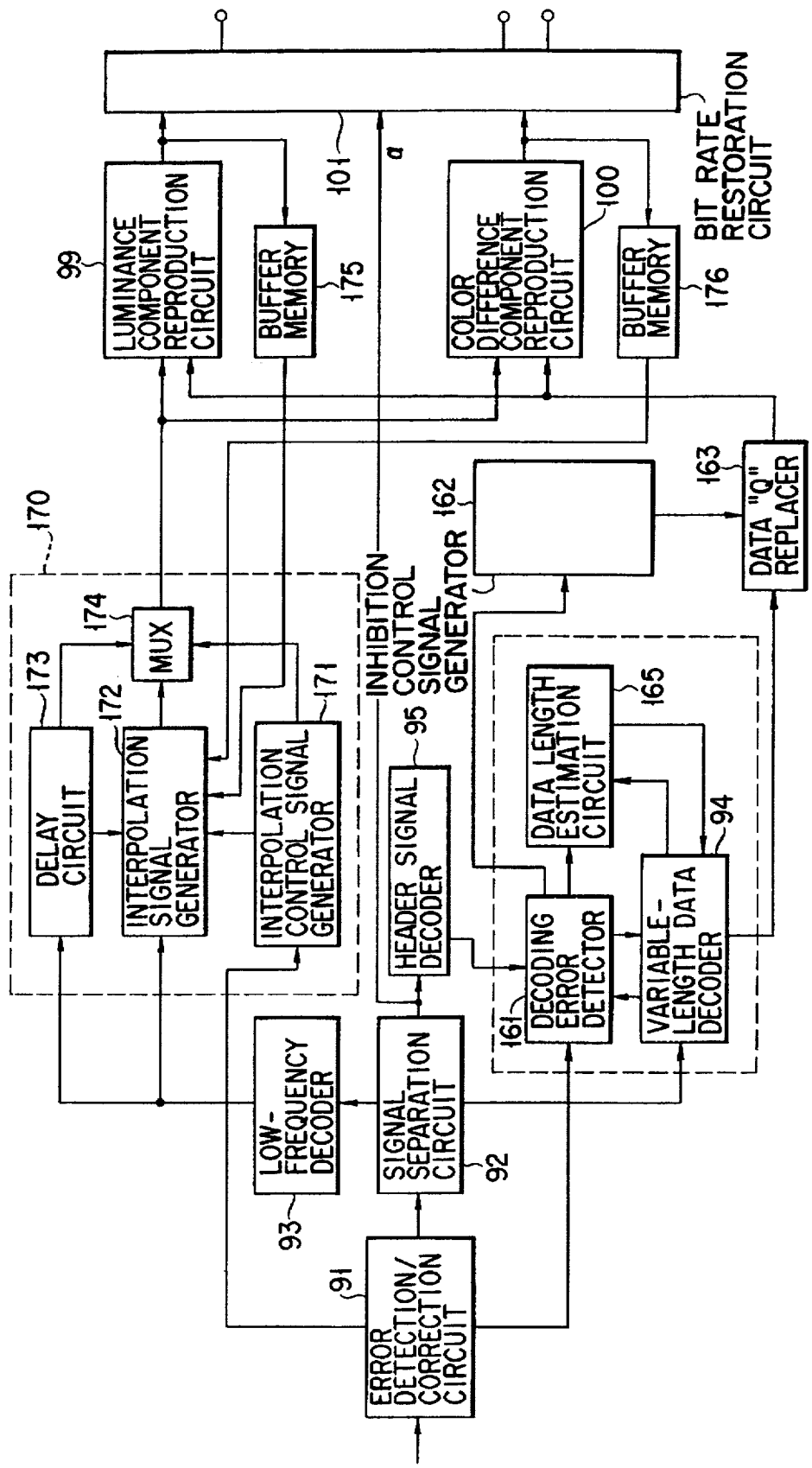
F I G. 24

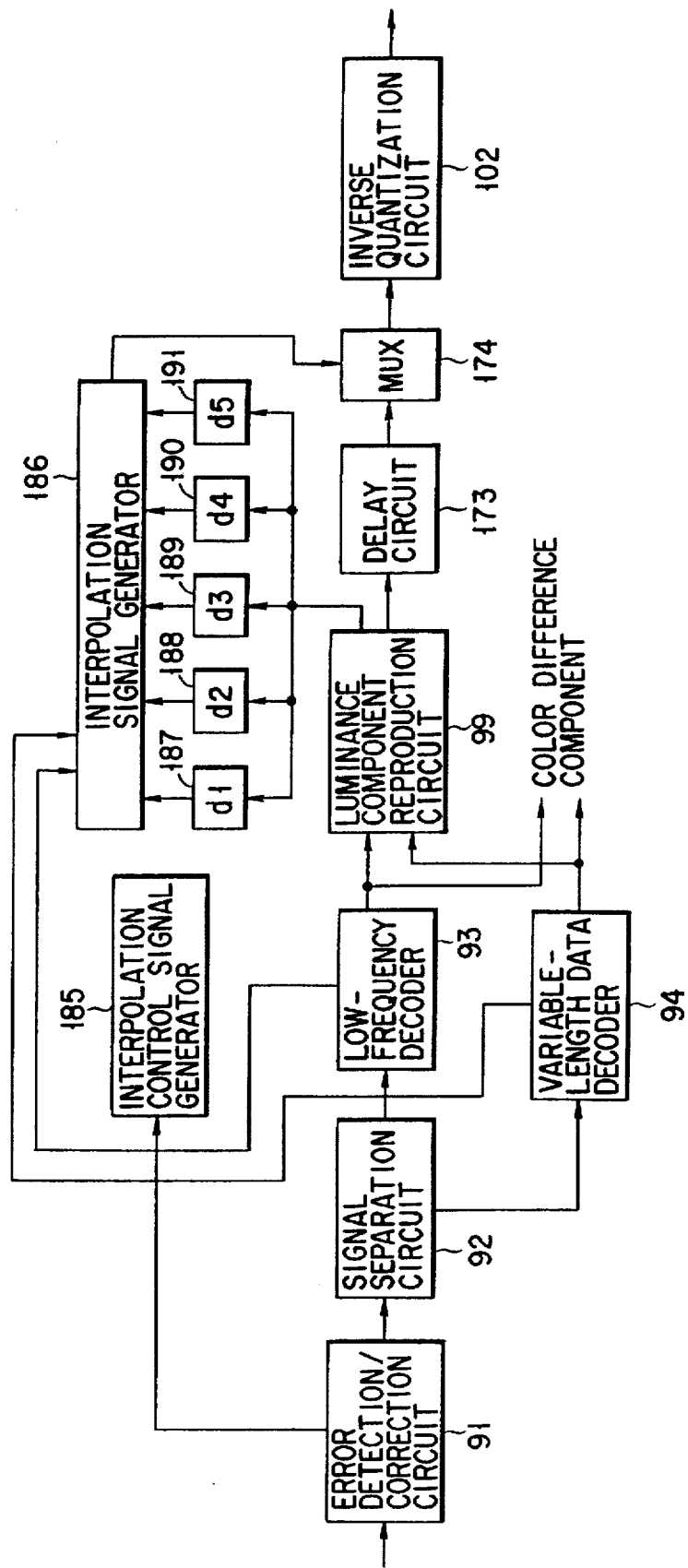
F I G. 26

FIG. 37A (PRIOR ART)

| $D_A$ | A1 | 0 | 0 |
|---|---|---|---|
| A2 | A4 | 0 | 0 |
| A3 | 0 | 0 | 0 |
| 0 | 0 | 0 | 0 |

Y1 SIGNAL

FIG. 37B (PRIOR ART)

| $D_B$ | B1 | 0 | 0 |
|---|---|---|---|
| B2 | B4 | 0 | 0 |
| B3 | 0 | 0 | 0 |
| 0 | 0 | 0 | 0 |

Y2 SIGNAL

FIG. 37C (PRIOR ART)

| $D_C$ | C1 | C5 | C6 |
|---|---|---|---|
| C2 | C4 | C7 | 0 |
| C3 | C8 | 0 | 0 |
| 0 | 0 | 0 | 0 |

Cb SIGNAL

FIG. 37D (PRIOR ART)

| $D_D$ | D1 | 0 | 0 |
|---|---|---|---|
| D2 | 0 | 0 | 0 |
| D3 | 0 | 0 | 0 |
| 0 | 0 | 0 | 0 |

Cr SIGNAL

FIG. 38A (PRIOR ART)

| A1 | A2 | A3 | A4 | E0B$_A$ ←(a) |

FIG. 38B (PRIOR ART)

| B1 | B2 | B3 | B4 | B5 | E0B$_B$ ←(b) |

FIG. 38C (PRIOR ART)

| C1 | C2 | C3 | C4 | C5 | C6 | C7 | C8 | E0B$_C$ ←(c) |

FIG. 38D (PRIOR ART)

| D1 | D2 | D3 | E0B$_D$ ←(d) |

FIG. 38E (PRIOR ART)

| (a) | (b) | (c) | (d) | E$_{OM}$ |

F I G. 39

| : | NTH MACROBLOCK CODE AMOUNT | L | (N+1)TH MACROBLOCK CODE AMOUNT | L | (N+2)TH MACROBLOCK CODE AMOUNT | : |

F I G. 40A

| : | LOW-FREQUENCY COMPONENT | L | HIGH-FREQUENCY COMPONENT | LOW-FREQUENCY COMPONENT | L | HIGH-FREQUENCY COMPONENT | LOW-FREQUENCY COMPONENT | L | HIGH-FREQUENCY COMPONENT | : |
| NTH MACROBLOCK | | | | (N+1)TH MACROBLOCK | | | | (N+2)TH MACROBLOCK | | | |

F I G. 40B

| LOW-FREQUENCY COMPONENT | L | HIGH-FREQUENCY COMPONENT | LOW-FREQUENCY COMPONENT | L | HIGH-FREQUENCY COMPONENT | LOW-FREQUENCY COMPONENT | L | HIGH-FREQUENCY COMPONENT |
| NTH MACROBLOCK | | | (N+1)TH MACROBLOCK | | | (N+2)TH MACROBLOCK | | |

HIGH EFFICIENCY CODING SIGNAL PROCESSING APPARATUS WITH ERROR PROPAGATION INFLUENCE REDUCTION

This is a continuation of application Ser. No. 07/891,952, filed on Jun. 1, 1992, now abandoned.

BACKGROUND OF THE INVENTION

1. Field of the Invention

The present invention relates to a high efficiency coding signal processing apparatus and, more particularly, to a high efficiency coding signal processing apparatus suitable for a recording/reproducing apparatus for recording/reproducing image data to/from various types of recording media.

2. Description of the Related Art

Recently, digital processing of image signals has been studied. Especially, various coding systems have been proposed to standardize high efficiency coding for compressing image data. High efficiency coding techniques are used to encode image data at small bit rates to increase the efficiency of digital transmission, recording, and the like. As such a high efficiency coding system, CCITT (Comite Consultatif International Telegraphique et Telephonique) has proposed standardization recommendation H. 261 for television meeting/television telephone techniques, a JPEG (Joint Photographic Experts Group) system for color still images, and an MPEG (Moving Picture Experts Group) system (described in detail in "Unification of High Efficiency coding Systems for Images", NIKKEI ELECTRONICS 1990. 10. 15 (No. 511)). These three types of proposals are associated with systems based on DCT (Discrete Cosine Transform).

In the MPEG coding system, a GOP (Group Of Picture) is constituted by a predetermined number of frame images, and the recording rate is reduced by a predictive coding method using at least one frame of an intra-image coded image included in the GOP. The MPEG coding system is sometimes employed for a DAT (Digital Audio Tape Recorder) or a VTR (Video Tape Recorder). However, in this case, if the MPEG cording system is employed, since the data length is variable, the recording position of an intra-image coded image on a track cannot be specified. For this reason, the intra-image coded image may not be reproduced in a special reproduction mode such as the fast forward playback mode. In such a case, even if other coded data are accurately reproduced, these data cannot be decoded.

In contrast to this, in some method, only the intra-image coding scheme is used as a coding scheme for motion images instead of the MPEG system described above. FIG. 30 is a block diagram showing a conventional high efficiency coding signal processing apparatus of this type disclosed in "AN EXPERIMENTAL STUDY FOR A HOME-USE DIGITAL VTR" (IEEE vol. 35, No. 3, August 1989).

Referring to FIG. 30, a video signal is sampled such that a luminance signal Y is sampled by, e.g., a 13.5-MHz sampling clock, while color difference signals Cr and Cb are sampled by, e.g., a 13.5/4-MHz sampling clock These Y, Cr and Cb are input to a memory 1. The memory 1 converts the input interlaced signals into a frame structure, and at the same time outputs the signals to a bit rate reduction circuit 2 in units of blocks, each constituted by 8×8 pixels in the horizontal and vertical directions.

FIG. 31 is a block diagram showing the detailed arrangement of the bit rate reduction circuit 2.

Signals constituted by blocks, each consisting of 8×8 pixels, are input to a DCT circuit 3 of the bit rate reduction circuit 2. The DCT circuit 3 transforms the input signals into frequency components by 8×8 two-dimensional DCT (Discrete Cosine Transform). With this operation, spatial correlation components can be eliminated. More specifically, the outputs from the DCT circuit 3 are supplied to an adaptive quantization circuit 5 through a buffer memory 4. The adaptive quantization circuit 5 then quantizes the signals again to reduce the redundancy of each block signal. In this case, a data amount evaluation circuit 7 generates coefficients on the basis of the data supplied from the DCT circuit 3, so that the adaptive quantization circuit 5 performs quantization based on the coefficients.

Furthermore, the quantized data are supplied to a variable-length encoder 6 and are converted into, e.g., Huffman codes on the basis of the statistic code amount of quantized outputs with this processing, a small number of bits are allocated to data having high occurrence probability, whereas a large number of bits are allocated to data having low occurrence probability, thereby further reducing the transmission amount. In this manner, 162-Mbps data is compressed into 19-Mbps data, and the compressed data is supplied to an encoder 8 in FIG. 30.

As a Huffman coding scheme, a two-dimensional Huffman coding scheme is employed. In this scheme, coding is performed on the basis of the length of continuation of "0"s (to be referred to as zero-run data hereinafter) of quantized data output from the adaptive quantization circuit 5 and a value other than "0" which appears after "0"s (to be referred to as a non-zero coefficient hereinafter). The adaptive quantization circuit 5 sequentially outputs data, from low-frequency components to high-frequency components. These series of data are converted into data constituted by zero-run counts (Zrn), non-zero coefficient code lengths (Amp), and non-zero coefficient data codes. Note that Amp data indicates a specific number of bits which represent a non-zero coefficient, and is defined as in Table 1 below:

TABLE 1

| Input Data | Amp | Non-Zero Coefficient Data Code |
|---|---|---|
| −1,1 | 1 | 0,1 |
| −3,−2,2,3 | 2 | 00,01,10,11 |
| −7, . . . −4,4, . . . ,7 | 3 | 000,001,010,011,100,101,110,111 |
| −15, . . . ,−8,8, . . . ,15 | 4 | . . . |
| −31, . . . ,−16,16, . . . ,31 | 5 | . . . |
| . . . | | . . . |

The variable-length encoder 6 has a two-dimensional Huffman table which is addressed by the Zrn and Amp data of a quantized output. In the Huffman table, a code constituted by a smaller number of bits is stored at an address designated by data having statistically higher probability. Huffman coding is performed by outputting a Huffman code at a designated address, thus achieving a reduction in bit rate. Upon converting a quantized output into a Huffman code, the variable-length encoder 6 adds a non-zero coefficient data code to the Huffman code, and outputs the resultant data. Although the code length of a non-zero coefficient data code is variable, the code can be decoded by identifying its Amp data.

As described above, in Huffman coding, Huffman codes are statistically allocated to Zrn/Amp data combinations, and in decoding, Amp data is obtained to decode a non-zero coefficient data code.

The encoder 8 adds parity for error correction to the input data and outputs the resultant data to a channel encoder 10. In this case, the encoder 8 converts the variable-length data of each block into a fixed-length sync block synchronized with a sync signal and outputs the resultant data. The channel encoder 10 records/encodes the outputs from the encoder 8 and sound signals from a sound processor 9 in accordance with the characteristics of a recording medium, and supplies the resultant data to a recording amplifier (R/A) 11, thus recording the data on a recording medium 12. With this processing, as shown in FIG. 32, the data of the respective blocks are converted into sync blocks having the same data length and recorded.

In the reproduction mode, a reproduction signal from the recording medium 12 is supplied to a detector 14 through a reproduction amplifier (H/A) 13. The detector 14 detects the bit clock of the reproduction signal and decodes the recorded data. The detector 14 then performs TBC (Time Base Correction processing) and the like to correct the time base of the data, and outputs the resultant data to a decoder 15. The decoder 15 corrects errors such as random errors and burst errors, caused in recording and reproduction, by using correction codes, and supplies the corrected data to a bit rate decoder 16. The bit rate decoder 16 decodes each variable-length code from the decoder 15 and performs inverse quantization processing and inverse DCT processing, thereby restoring the original information. In this case, since irreversible compression processing is performed in the re-quantization process, slight distortion occurs. The data decoded by the bit rate decoder 16 is supplied to a memory 17 to be converted into data having the same format as that of the input data. Thereafter, the resultant data is output from the memory 17. Note that a sound processor 18 performs sound processing with respect to the sound signal from the detector 14 and outputs the resultant signal.

As described above, according to the system shown in FIG. 30, coded data are recorded in units of sync blocks of a fixed length in the recording mode so that the frames correspond to the respective recording positions, and the data can be reproduced in special reproduction modes in a VTR and the like to some extent. However, coding efficiency is still low in this coding scheme.

In addition, a system for recording data by limiting the code amount per unit recording time to a predetermined range is disclosed in "Rate Adaptive Type DCT Coding System for Solid-State Still Electronic Camera", the Institute of Electrical Communication in Japan, Spring Convention D-159, 1989. FIG. 33 is a circuit diagram for explaining this coding system.

A block signal constituted by 8×8 pixels input through an input terminal 21 undergoes DCT processing in a DCT circuit 22 and is supplied to a scan converter 23. The outputs from the DCT circuit 22 are sequentially arranged from low-frequency components to high-frequency components in the horizontal and vertical directions, as shown in FIG. 34. Since information is concentrated on the low-frequency components of DCT coefficients in the horizontal and vertical directions, zigzag scanning is performed from the low-frequency components to the high-frequency components in the horizontal and vertical directions to output the DCT coefficients to a quantization circuit 24, as indicated by the numbers shown in FIG. 34. Note that number "0" in FIG. 34 indicates a DC component, and its value is the average of all the transform coefficients. Other portions are AC components.

A parameter α representing the information amount of an input image is input to a multiplier 26 through an input terminal 28. The multiplier 26 receives information having a basic quantization width, preset for each frequency component of the transform coefficients from the DCT circuit 22, from a Q table 27, and multiplies the information by the parameter α. The multiplier 26 outputs the resultant information to the quantization circuit 24 through a limiting circuit 25. The quantization circuit 24 quantizes the DCT coefficients. Note that the limiting circuit 25 limits the minimum quantization width on the basis of a coding efficiency and data from the Q table 27. Therefore, in the quantization circuit 24, the quantization width is corrected in units of frequency components by outputs from the limiting circuit 25, thus controlling the coding rate.

Furthermore, the assignee of the present invention has disclosed "Image Coding System" in Japanese Patent Application No. 2-404811, in which data appearing at an output terminal 30 in FIG. 33 is converted into fixed-length data. FIG. 35 is a block diagram for explaining this coding system.

The macroblock signal shown in FIG. 36 is input to an input terminal 31. As shown in FIG. 36, if the sampling frequency is 4 fsc (fsc denotes a color sub-carrier frequency), the effective pixel count of one frame is about horizontal 768 pixels×vertical 488 pixels. The sampling rate for color difference signals Cr and Cb in the horizontal direction is 2 fsc, i.e., ½ the sampling frequency. Therefore, the color difference signals Cr and Cb, each corresponding to one block consisting of 8×8 pixels, are sampled during the interval in which luminance blocks Y1 and Y2, each consisting of 8×8 pixels, are sampled. These four blocks Y1, Y2, Cr, and Cb constitute a macroblock. The data of this macroblock is input to a DCT circuit 33 through a buffer memory 32 to be subjected to DCT. The resultant data is quantized by a quantization circuit 34, thus obtaining the same quantized output as that obtained by the system shown in FIG. 33.

FIGS. 37A to 37D are views for explaining the data format of one macroblock. FIGS. 37A to 37D respectively show the quantized outputs of the respective blocks Y1, Y2, Cb, and Cr in the form of a 4×4 matrix. For the sake of descriptive convenience, assume that no zero-data is produced until transmission of data A to D of the respective blocks is completed.

As shown in FIGS. 37A to 37D, the blocks Y1, Y2, Cb, and Cr are respectively constituted by low-frequency components DA, DB, DC, and DD and high-frequency components A1 to A4, B1 to B5, C1 to C8, and D1 to D3. All other data are "0"s. The high-frequency components are transmitted in the order of numbers assigned to the corresponding blocks.

More specifically, as shown in FIGS. 38A to 38E, the data of the luminance block Y1 are transmitted, the sequence being the data A1, A2, A3, and A4; the data of the luminance block Y2, the sequence being B1, B2, . . . ; the data of the color difference block Cb, the sequence being C1, C2, . . . ; and the data of the color difference block Cr, the sequence being D1, D2, . . . At the end of each block, a code $E_{OB}$ indicating the end of block data is arranged. These block data are sequentially arranged, and one macroblock data is transmitted, as shown in FIG. 38E. The end of each macroblock is indicated by a code $E_{OM}$. Note that an end code $E_{OBD}$ of the color difference block Cr may be omitted, and the code $E_{OM}$ may be used to indicate the end of the block Cr as well. At the start position of each macroblock, code amount data L representing the code amount of the macroblock is added, as shown in FIG. 39.

Quantized data output from the quantization circuit 34 in FIG. 35 is frequency-divided, and the low-and high-frequency components are respectively encoded by low- and high-frequency encoders 35 and 36. The coded data from the low- and high-frequency encoders 35 and 36 are supplied to a multiplexer (to be referred to as an MUX hereinafter) 39 through buffer memories 37 and 38, respectively, so as to be time-division multiplexed. FIGS. 40A and 40B are views for explaining a multiplexing method. FIG. 40A shows a data format in which low-and high-frequency components are sequentially arranged after each code amount data L. FIG. 40B shows a data format in which a low-frequency component is arranged before each code amount data L, while a high-frequency component is arranged after each code amount data L.

The data output from the MUX 39 is supplied to a pack circuit 40, in which a macroblock address (MBA) and a macroblock pointer (MBP) are added to the data in units of sync blocks. FIG. 41 shows the resultant data format. A macroblock address indicates the position of corresponding macroblock data on the frame, i.e., the order of the macroblock data in one frame or one field, and is arranged after, e.g., a sync signal. A macroblock pointer is arranged after this macroblock address, and the code amount data L and the macroblock shown in FIG. 39 are arranged in an image coding data sector. Each image coding data sector is constituted by 54 bytes, and a macroblock starts or ends at a halfway position in the image coding sector, as shown in FIG. 42. A macroblock pointer indicates a specific byte position in each image coding data sector from which a corresponding macroblock starts. With this processing, the pack circuit 40 outputs coded data as fixed-length data within a frame.

Note that in the sync series format shown FIG. 41, parity P is added, as error correction codes, to two C1 series (61, 57) of Read. Solomon codes (R. S codes). As error correction codes in a magnetic recording system, Read. Solomon codes are widely used as in "Error Correction Apparatus" in Published Unexamined Japanese Patent Application No. 54-32240, a D-1 digital VTR, a D-2 digital VTR, a DAT, and the like. For example, in the D-1 standard, codes of C1 series (64, 60) and C2 series (32, 30) are employed. In the D-2 standard, codes of C1 series (93, 85) and C2 series (68, 64) are employed. In the DATA, codes of C1 series (32, 28) and C2 series (32, 26) are employed.

FIG. 43 is a view for explaining the D-1 standard. FIG. 44 is a view showing a recording state of a recording track of a VTR.

In the C1 series, four correction codes p, q, r, and s are allocated to 60 data. In the C2 series, two correction codes P and Q are allocated to 30 data. As show in FIG. 44, a plurality of data in FIG. 43 are continuously recorded on one track of the VTR. Note that n (n≧1) C1 series codes are arranged in one sync block.

As described above, in the system shown in FIG. 35, input data is classified in units of frequency components of transform coefficients, low-frequency component coded data are arranged at reference positions in each macroblock, and macroblock pointers and macroblock addresses representing data positions on a frame are arranged in units of sync blocks having a whole number of sync data. In addition, by adding the code amount data L to a macroblock, the total code amount of the macroblock is defined so that the data is converted into fixed-length data within a frame. With macroblock addresses and macroblock pointers, the correspondence between the respective macroblocks and positions on a frame can be defined.

In the coding system shown in FIG. 35, however, since each macroblock is converted into variable-length data, the influence of error propagation is large. For example, if this system is used to record/reproduce data on/from a recording medium, e.g., a magnetic tape, in which errors are caused at a relatively high frequency, as in a magnetic recording/reproducing apparatus, decoding is difficult to perform in a special reproduction mode such as the fast forward reproduction in which errors occur inevitably. In addition, there is no effective means for performing error adjustment when an error cannot be corrected.

Furthermore, in this system, if repetitive coding is performed as in dubbing processing and editing processing, the bit allocation of the respective blocks is changed in each quantization processing. Therefore, even in digital transmission, errors are increased for each coding processing.

As described above, in the above-described conventional high efficiency coding signal processing apparatus, the influence of error propagation is very large and hence decoding may become impossible. In addition, there is no effective means for error adjustment. Moreover, since the bit allocation of the respective block data is changed upon repetitive coding processing, errors are increased for each coding processing.

SUMMARY OF THE INVENTION

It is, therefore, an object of the present invention to provide a new and improved high efficiency coding signal processing apparatus which can reduce the influence of error propagation, efficiently correct errors, and reduce a deterioration in signal due to repetitive coding.

According to the first aspect of the present invention, there is provided a high efficiency coding signal processing apparatus comprising data compressing means for performing frequency transformation of data in units of predetermined blocks within one frame and outputting transform coefficients for data compression, low-frequency component coding means for encoding low-frequency components of the transform coefficients from the data compressing means, high-frequency component coding means for encoding high-frequency components of the transform coefficients from the data compressing means, first transmission sequence packet means for outputting data from the low-frequency component means at a predetermined period, and second transmission sequence packet means for performing predetermined sequencing with respect to data from the high-frequency component coding means and outputting the data.

According to the second aspect of the present invention, there is provided a high efficiency coding signal processing apparatus comprising a variable-length data decoder for decoding input variable-length data, a decoding error detector for detecting data which cannot be decoded by the variable-length data decoder, and for determining validity of each decoded output, and replacing means for replacing each decoded output from the variable-length data decoder with a predetermined value at a timing based on the determination result from the decoding error detector, and outputting the resultant data.

According to the third aspect of the present invention, there is provided a high efficiency coding signal processing apparatus comprising decoding means for decoding input data encoded in units of predetermined blocks within one frame, a decoding error detector for detecting data which cannot be decoded by the decoding means, and for determining validity of each decoded output, holding means for holding each output from the decoding means, and data length estimation means for receiving data of a block adjacent to an error block from the holding means, estimating a data length of the error block, and designating decoding start of data of a next block to the decoding means at a timing based on the determination result from the decoding error detector.

According to the fourth aspect of the present invention, there is provided a high efficiency coding signal processing apparatus comprising decoding means for decoding input data encoded in units of predetermined blocks within one frame, error detection means for detecting an error in the input data, holding means for holding each output from the decoding means, interpolation signal generating means for determining correlation between data of an error block designated by the error detection means and data of a block adjacent to the error block which is supplied from the holding means, thereby generating interpolation data, and replacing means for replacing the data of the error block with the interpolation data, and outputting the resultant data.

In the first aspect of the present invention, the low-frequency components and the high-frequency components are separately transmitted by the first and second transmission sequence packet means, respectively. For this reason, an error caused in the high-frequency components does not propagate to the low-frequency components. Low frequency-components are output at a predetermined period. Even if an error is caused in a high-frequency component, low-frequency components can be decoded, thus reducing a visual deterioration.

In the second aspect of the present invention, the decoding error detector detects an error when data which cannot be decoded is produced in the variable-length data decoder. Since an error may be included in decoded data immediately before the data which cannot be decoded, the decoding error detector determines that decoded data immediately before the data which cannot be decoded is invalid. The replacing means replaces the data which are determined as invalid data with, e.g., "0"s, thereby preventing a deterioration in image quality due to decoding errors.

In the third aspect of the present invention, the holding means holds the data of a block adjacent to a predetermined block in terms of time and space. The data length estimation means receives an output from the holding means, and estimates the data length of the predetermined block on the basis of the data of the adjacent block. If a decoding error is detected by the error detector, the data length estimation means estimates the data length of the error block, determines the start position of the data of the next block, and designates decoding start to the decoding means, thereby reducing the number of blocks which cannot be decoded due to errors.

In the fourth aspect of the present invention, the interpolation signal generating means receives an output from the holding means, and determines correlation between adjacent blocks. Upon determining high correlation, the interpolation signal generating means generates interpolation data by obtaining the average of the data of the adjacent blocks. The replacing means replaces the data of an error block with the interpolation data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing an embodiment of a high efficiency coding signal processing apparatus on the decoding side according to the present invention;

FIG. 13 is a block diagram showing still another embodiment of the present invention;

FIGS. 14A and 14B are views for explaining the embodiment shown in FIG. 13;

FIGS. 15A and 15B are views for explaining the embodiment shown in FIG.

FIGS. 16A to 16C are views for explaining the embodiment shown in FIG. 13;

FIGS. 17A and 17B are views for explaining the embodiment shown in FIG. 13;

FIG. 18 is a block diagram showing still another embodiment of the present invention;

FIG. 20 is a flow chart for explaining an operation of the embodiment shown in FIG. 18;

FIG. 22 is a view for explaining an operation of the embodiment shown in FIG. 18;

FIG. 23 is a view for explaining an operation of the embodiment shown in FIG. 18;

FIG. 24 is a block diagram showing still another embodiment of the present invention;

FIG. 26 is a block diagram showing still another embodiment of the present invention;

FIGS. 37A to 37D are views for explaining a macroblock;

FIGS. 38A to 38E are views for explaining conventional data formats;

FIG. 39 is a view for explaining a conventional data format employed in the conventional apparatus in FIG. 35;

FIGS. 40A and 40B are views for explaining conventional data formats employed in the conventional apparatus in FIG. 35;

DETAILED DESCRIPTION OF THE PREFERRED EMBODIMENTS

Figure 1:
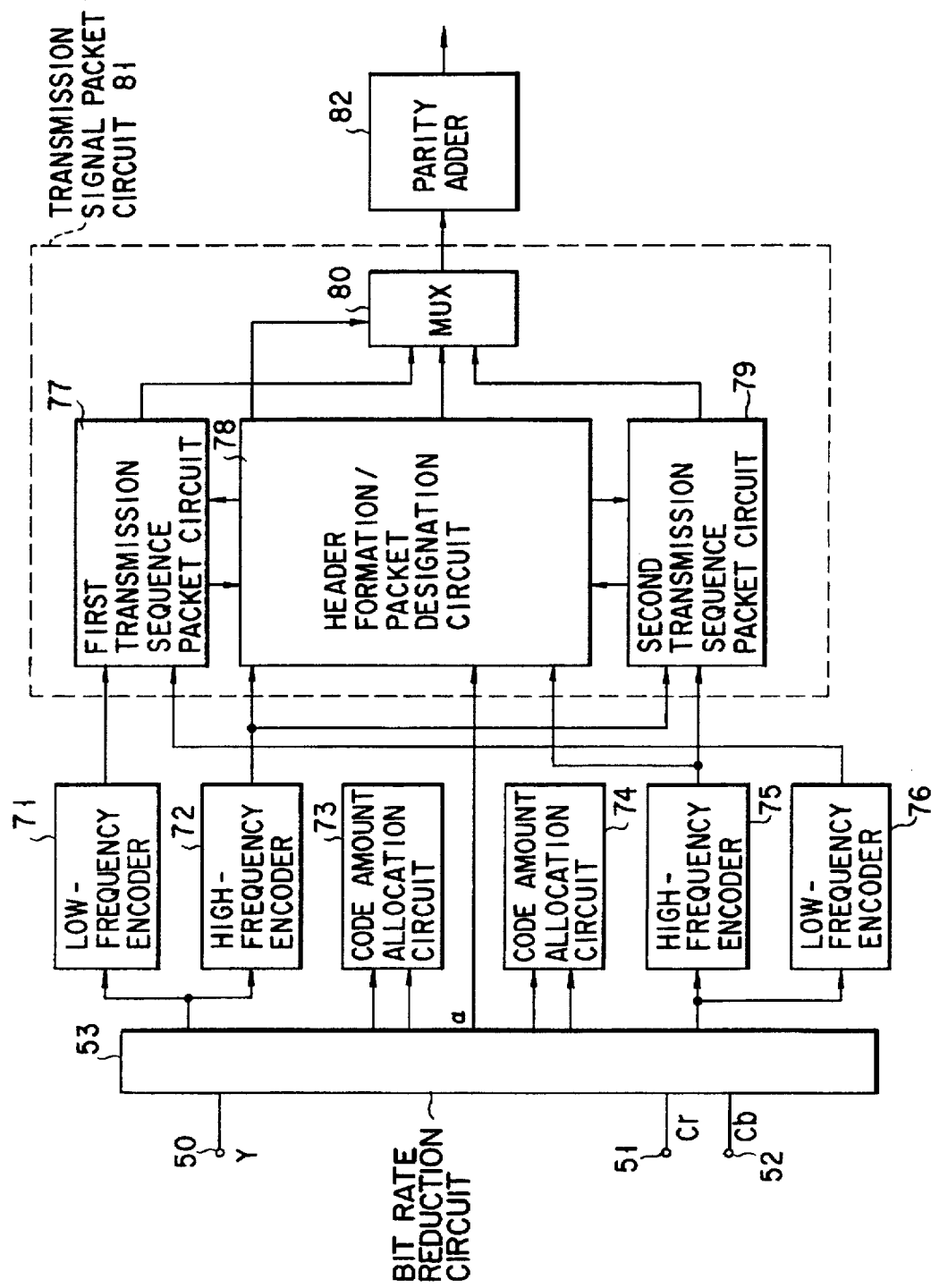
FIG. 1 is a block diagram showing an embodiment of a high efficiency coding signal processing apparatus on the coding side according to the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings. FIG. 1 is a block diagram showing an embodiment of a high efficiency coding signal processing apparatus on the coding side according to the present invention.

Figure 2:
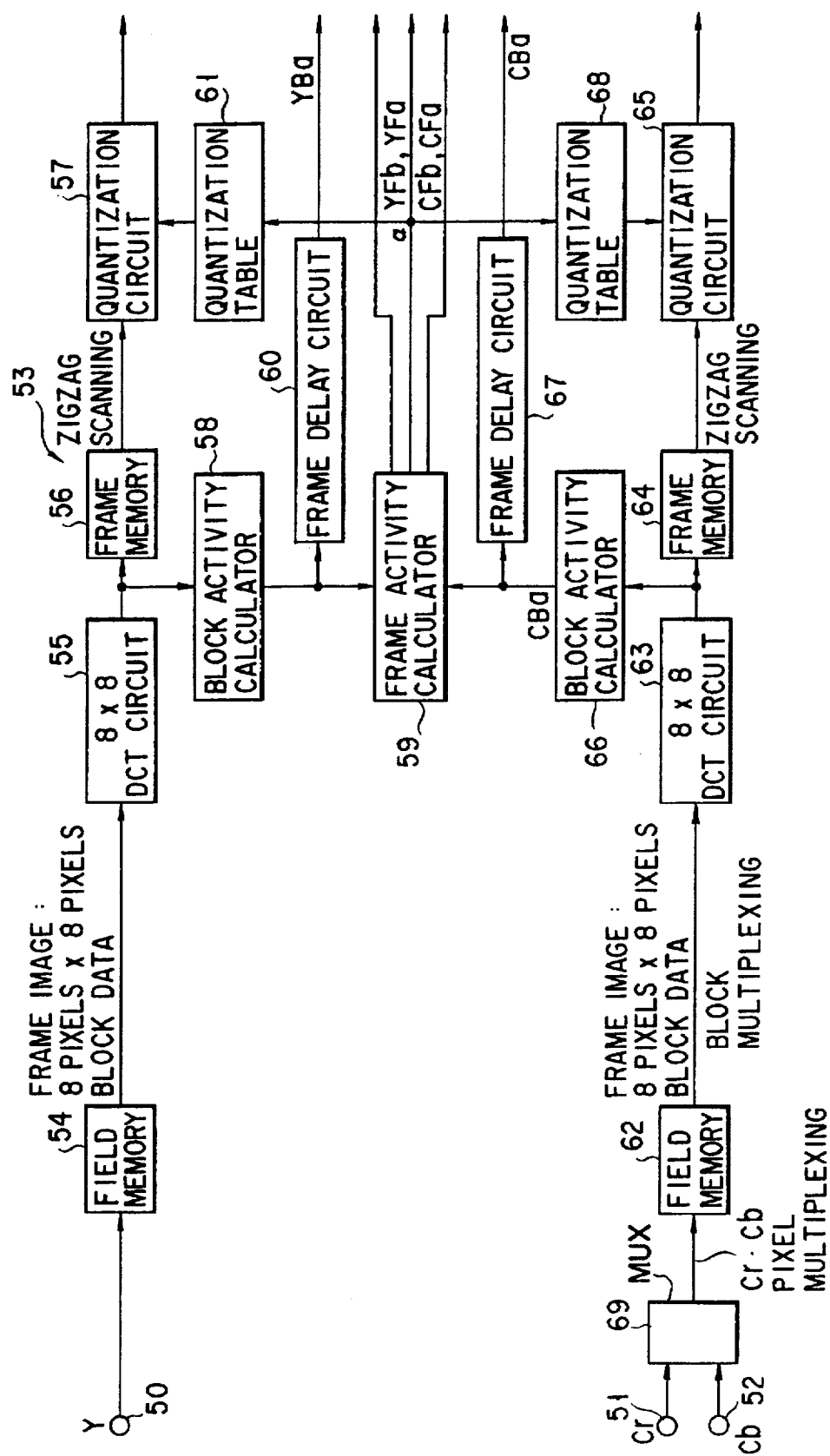
FIG. 2 is a block diagram showing the detailed arrangement of a bit rate reduction circuit 53 in FIG. 1.

A luminance signal Y and color difference signals Cr and Cb are input to a bit rate reduction circuit 53 of a recording system through input terminals 50, 51, and 52, respectively. FIG. 2 is a block diagram showing the detailed arrangement of the bit rate reduction circuit 53. The luminance signal Y from the input terminal 50 is supplied to a field memory 54. The field memory 54 outputs data to a DCT circuit 55 in units of blocks, each constituted by 8×8 pixels. The DCT circuit 55 performs 8×8 two-dimensional DCT and outputs transform coefficients to a frame memory 56. The frame memory 56 sequentially performs zigzag scanning with respect to the transform coefficients, arranges the coefficients, starting from low-frequency components, and outputs them to a quantization circuit 57. The quantization circuit 57 quantizes the transform coefficients on the basis of basic quantization information from a quantization table 61 (to be described later) to reduce the bit rate, and outputs the resultant coefficients.

Meanwhile, the color difference signals Cr and Cb are respectively input to the input terminals 51 and 52, and an MUX 69 supplies the color difference signals Cr and Cb to a field memory 62 by time-division multiplexing. The field memory 62 sequentially outputs the color difference signals Cb, Cr, Cb, . . . in units of blocks, each constituted by 8×8 pixels. The outputs from the field memory 62 are supplied to a quantization circuit 65 through a DCT circuit 63 and a frame memory 64. The DCT circuit 63, the frame memory 64, and the quantization circuit 65 have the same arrangements as those of the DCT circuit 55, the frame memory 56, and the quantization circuit 57, respectively. The quantization circuit 65 is designed to quantize transform coefficients on the basis of basic quantization information from a quantization table 68 and output the resultant coefficients.

The outputs from the DCT circuits 55 and 63 are also supplied to block activity calculators 58 and 66. The block activity calculators 58 and 66 respectively obtain block activities YBa and CBa representing information amounts (high-resolution information amounts) in units of blocks, and output them to a frame activity calculator 59. The frame activity calculator 59 obtains a parameter α for adjusting frame activities YFa and CFa of the luminance signal Y and a color signal C and basic quantization information, and allocation bit counts YFb and CFb of the luminance signal Y and the color signal C which can be used in one frame.

The parameter α is supplied to the quantization tables 61 and 68. The quantization tables 61 and 68 respectively supply data, obtained by multiplying the basic quantization information stored in the respective tables by the parameter α, to the quantization circuits 57 and 65. The block activities YBa and CBa from the block activity calculators 58 and 66 are respectively output through frame delay circuits 60 and 67. The frame delay circuits 60 and 67 perform time adjustment by delaying the block activities YBa and CBa, respectively.

Referring to FIG. 1, the outputs from the bit rate reduction circuit 53 of a luminance system are input to a low-frequency encoder 71 and a high-frequency encoder 72. In addition, the outputs from the quantization circuit 65 of a color difference system are input a low-frequency encoder 76 and a high-frequency encoder 75. The activities YBa and YFa and the allocation bit count YFb are input to a code amount allocation circuit 73. The activities CBa and CFa and the allocation bit count CFb are input to a code amount allocation circuit 74. The low-frequency encoders 71 and 76 encode the low-frequency components of quantized outputs and output the resultant data to a first transmission sequence packet circuit 77 of a transmission signal packet circuit 81. The code amount allocation circuits 73 and 74 determine bit counts (bit allocation amounts) for coding of high-frequency components on the basis of the input activities and the allocation bit count data. The high-frequency encoders 72 and 75 convert the high-frequency components of the quantized outputs into variable-length code data with bit counts based on the data from the code amount allocation circuits 73 and 74, and output the code data to a header formation/packet designation circuit 78 and a second transmission sequence packet circuit 79.

The first and second transmission sequence packet circuits 77 and 79 are controlled by the header formation/packet designation circuit 78 to respectively output the coded low- and high-frequency components to an MUX 80. For example, the low-frequency components are output in a predetermined order, whereas the high-frequency components are sequenced in units of blocks or variable-length codes. The header formation/packet designation circuit 78 forms header information consisting of a macroblock address MBA, a macroblock pointer MBP, a CRC (Cyclic Redundancy Code) as an error check code, and the like, and at the same time outputs a sequence control signal for designating a packet transmission sequence to the MUX 80. In addition, the header formation/packet designation circuit 78 adds a sync signal and an ID number for identification to the coded data.

The MUX 80 is controlled by the sequence control signal to output the data, supplied from the first and second transmission sequence packet circuits 77 and 79 and the header formation/packet designation circuit 78, to a parity adder 82 by time-division multiplexing. The parity adder 82 adds predetermined parity to the data from the MUX 80 and outputs the resultant data.

Figure 3:
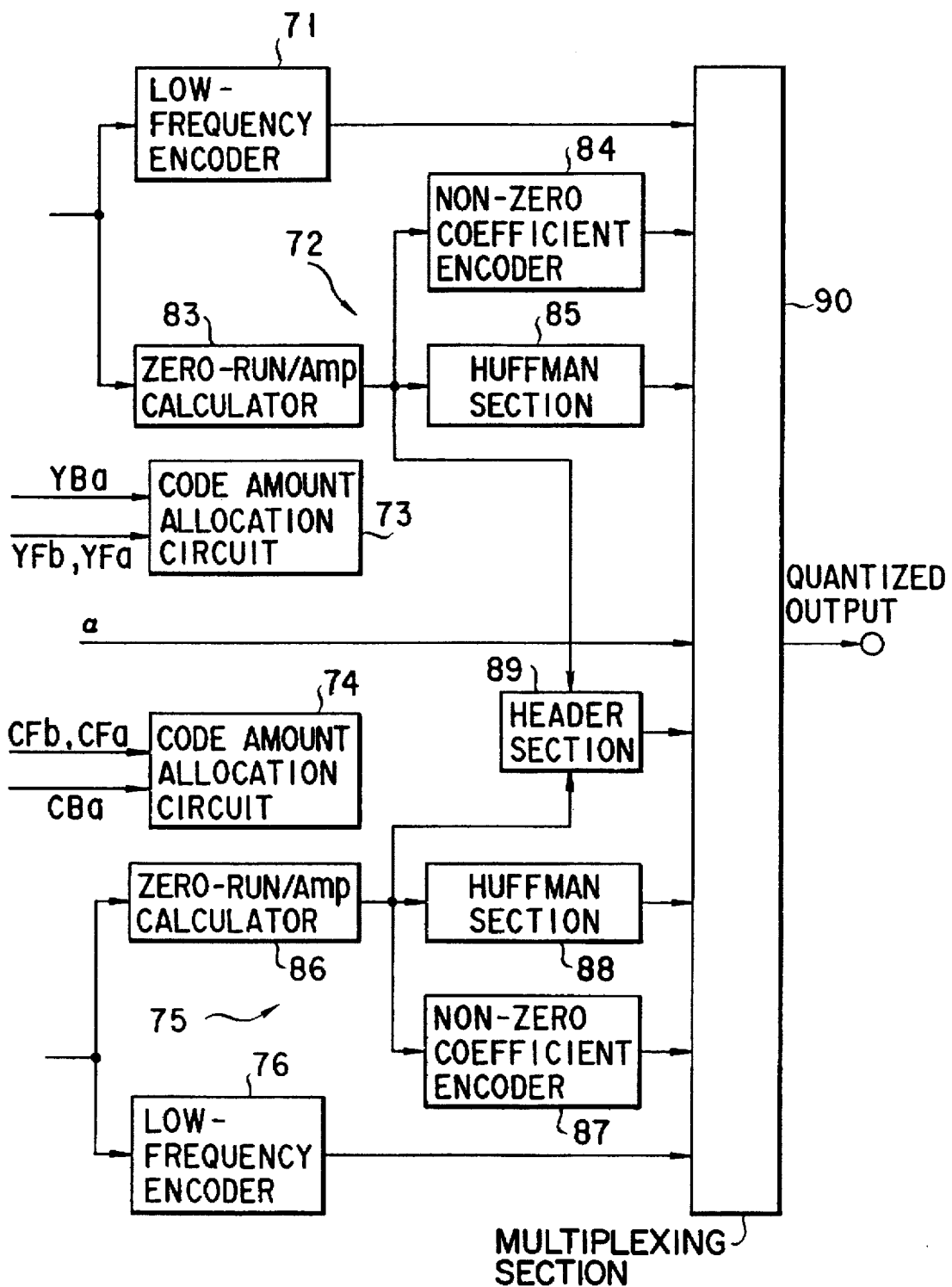
FIG. 3 is a block diagram showing the detailed arrangements of low-frequency encoders 71 and 76, high-frequency encoders 72 and 75, code amount allocation circuits 73 and 74, and a transmission signal packet circuit 81.

FIG. 3 is a block diagram showing the detailed arrangements of the low-frequency encoders 71 and 76, the high-frequency encoders 72 and 75, the code amount allocation circuits 73 and 74, and the transmission signal packet circuit 81.

The high-frequency encoder 72 is constituted by a zero-run/Amp calculating section 83, a non-zero coefficient coding section 84, and a Huffman coding section 85. The zero-run/Amp calculating section 83 obtains the zero-run data and Amp data of the AC components of quantized outputs, and outputs the data to the non-zero coefficient coding section 84, the Huffman coding section 85, and a header section 89. The Huffman coding section 85 converts the zero-run/Amp data combinations into Huffman codes and outputs them to a multiplexing section 90. The non-zero coefficient coding section 84 decodes non-zero coefficients and outputs the resultant data to the multiplexing section 90. Note that the arrangements of a zero-run/Amp calculating section 86, a non-zero coefficient coding section 87, and a Huffman coding section 88 of the color difference system are the same as those of the zero-run/Amp calculating section 83, the non-zero coefficient coding section 84, and the Huffman coding section 85 of the luminance system.

The header section 89 forms header information on the basis of the data from the zero-run/Amp calculating sections 83 and 86, and outputs the information to the multiplexing section 90. The header section 89 and the multiplexing section 90 constitute the transmission signal packet circuit 81 and the parity adder 82 in FIG. 1. The multiplexing section 90 arranges the input data in a predetermined order, adds parity to the data, and outputs the coded data.

FIG. 4 is a block diagram showing an embodiment on the decoding side.

For example, the coded data recorded on a recording medium is subjected to synchronous processing, demodulation processing, TBC (Time Base Correction) processing, and the like in a demodulation section (not shown) in the reproduction mode, and is subsequently input to an error detection/correction circuit 91. The error detection/correction circuit 91 performs error correction with respect to the input data. In addition, the circuit 91 adds an error flag to data which cannot be corrected, and outputs the resultant data. The data which have undergone error correction processing are output to a signal separation circuit 92.

The signal separation circuit 92 separates the input signals into low-frequency signals and high-frequency signals, and outputs them to a low-frequency decoder 93 and a variable-length data decoder 94, respectively. At the same time, the signal separation circuit 92 outputs a header portion to a header signal decoder 95, and outputs the parameter α to a bit rate restoration circuit 101. The header signal decoder 95 decodes the header portion and outputs the macroaddress MBA, the macroblock pointer MBP, and the code length L constituting header information. The low-frequency signal decoder 93 decodes the input signals, and extracts DC components. The decoder 93 then outputs luminance DC components to a luminance component reproduction circuit 99, and outputs color difference DC components to a color difference component reproduction circuit 100.

Meanwhile, the variable-length data decoder 94 is constituted by a Huffman decoding section 96, a zero-run/Amp decoding section 97 of the luminance system, and a zero-run/Amp decoding section 98 of the color difference system. The Huffman decoding section 96 starts a decoding operation by referring to the macroaddress MBA, the macroblock pointer MBP, and the code length L. The Huffman decoding section 96 is designed to stop decoding processing upon detection of the $E_{OB}$ code indicating the end of each block of Huffman codes or the $E_{OM}$ code indicating the end of each macroblock. The Huffman decoding section 96 separates the input data into zero-run data and Amp data, and outputs the data to the zero-run/Amp decoding sections 97 and 98 of the luminance and color difference systems.

The zero-run/Amp decoding sections 97 and 98 also receive the outputs from the signal separation circuit 92 and extract non-zero coefficient data codes corresponding to the respective Huffman codes by using the Amp data representing code lengths. The zero-run/Amp decoding sections 97 and 98 combine the Amp data with the non-zero coefficient data codes to decode the non-zero coefficients into the original data. In addition, the zero-run/Amp decoding sections 97 and 98 form high-frequency component data (zero data) on the basis of the zero-run data, and obtain all the high-frequency components by combining the high-frequency component data with the non-zero coefficients. The data decoded by the zero-run/Amp decoding section 97 is output to the luminance component reproduction circuit 99, whereas the data decoded by the zero-run/Amp decoding section 98 is output to the color difference component reproduction circuit 100.

The luminance component reproduction circuit 99 converts the low- and high-frequency luminance data into the original frequency signals, and sequentially arrange the signals, starting from the low-frequency signals. The circuit 99 outputs the arranged signals to the bit rate restoration circuit 101. The color difference component reproduction circuit 100 converts the low- and high-frequency color difference data into the original frequency signals, and arranges the signals, starting from the low-frequency signals. The circuit 101 then outputs the arranged signals to the bit rate restoration circuit 101.

Figure 5:
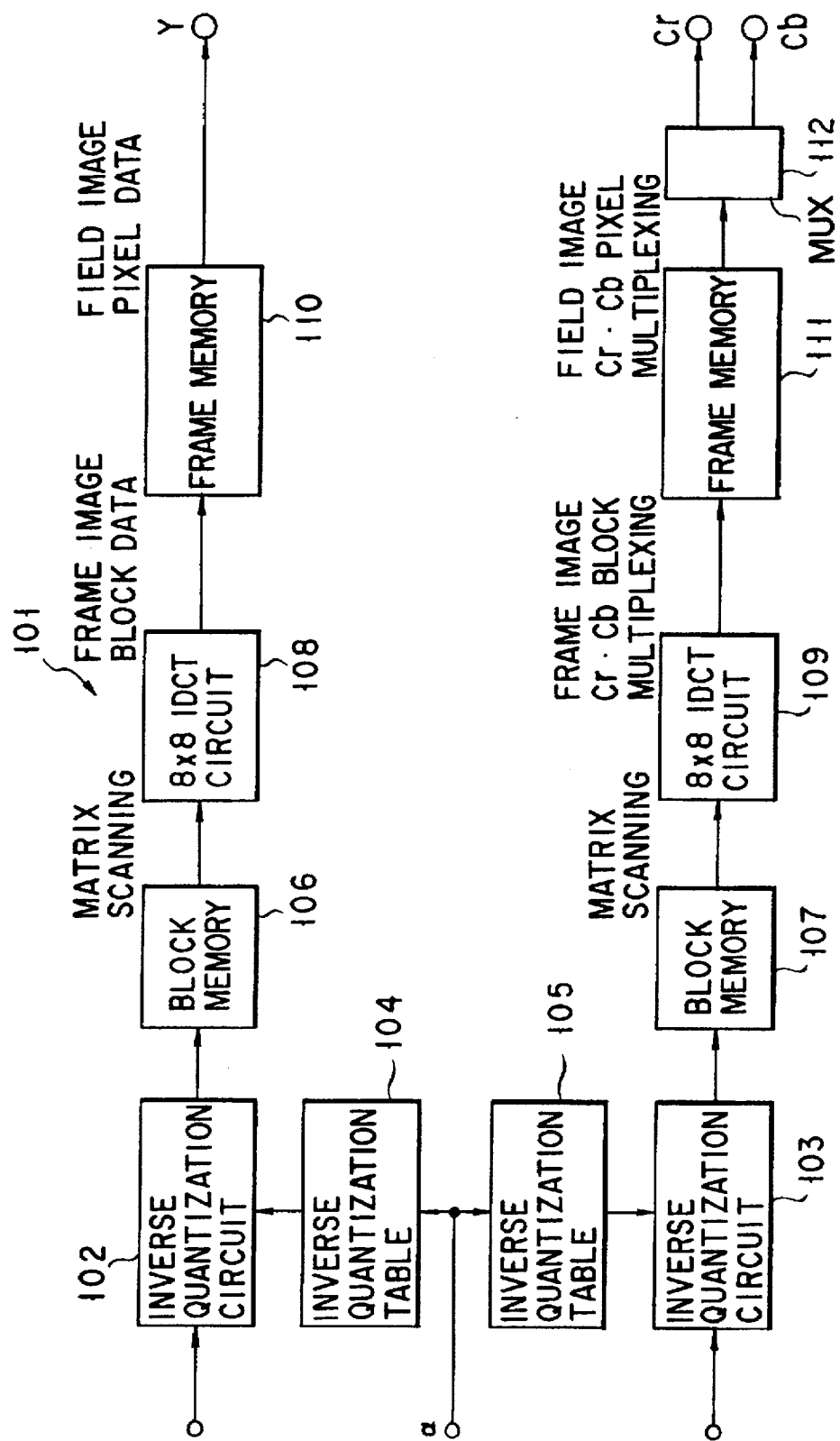
FIG. 5 is a block diagram showing the detailed arrangement of a bit rate restoration circuit 101 in FIG. 4.

FIG. 5 is a block diagram showing the detailed arrangement of the bit rate reproduction circuit 101.

The outputs from the luminance component reproduction circuit 99 and the color difference component reproduction circuit 100 are respectively supplied to irreversible quantization circuits 102 and 103. The parameter α from the signal separation circuit 92 is supplied to irreversible quantization tables 104 and 105. The irreversible quantization circuits 102 and 103 respectively receive data corresponding to the quantization tables 61 and 68 (see FIG. 2) in the recording mode from the irreversible quantization tables 104 and 105, and perform irreversible quantization with respect to the data, thereby restoring DCT coefficient data. These DCT coefficient data are respectively supplied to IDCT circuits 108 and 109 through block memories 106 and 107. The IDCT circuits 108 and 109 perform inverse DCT processing with respect to the input data to restore them to the original frequency axis, and output the resultant data to frame memories 110 and 111. The frame memories 110 and 111 convert the decoded block data into field data and output them. The outputs from the frame memory 111 are input to an MUX 112. The MUX 112 is designed to separately output the time-division multiplexed color difference signals Cr and Cb.

Figure 6:
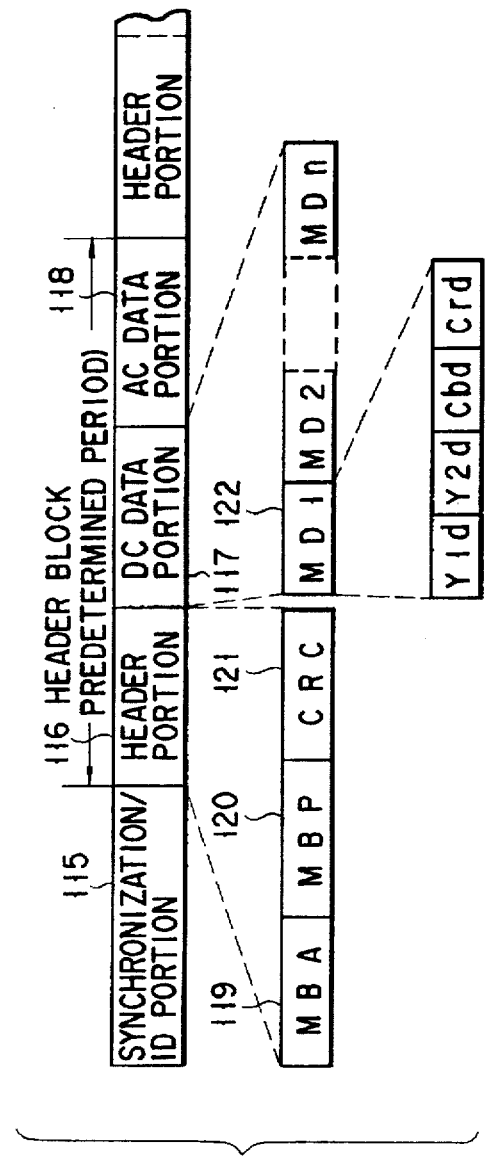
FIG. 6 is a view showing a data format employed in the embodiment shown in FIG. 1.
Figure 7:
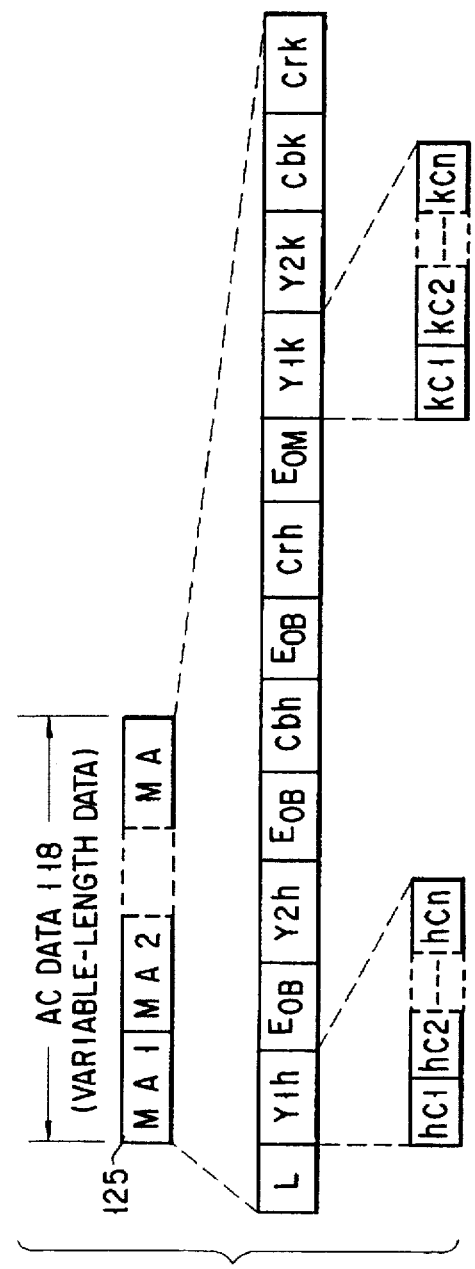
FIG. 7 is a view showing a data format employed in the embodiment shown in FIG. 1.

An operation of the high efficiency coding signal processing apparatus having the above-described arrangement will be described below with reference to FIGS. 6 and 7. FIGS. 6 and 7 are views for explaining data formats.

In the coding mode, the color difference signals Cr and Cb are multiplexed by the MUX 69 in FIG. 2 and input to the field memory 62. The field memories 54 and 62 convert the input luminance signal Y and color difference signals Cr and Cb into block data, each consisting of 8×8 pixels, and output them to the DCT circuits 55 and 63, respectively. The DCT circuits 55 and 63 perform frequency transformation by DCT. The DCT coefficients from the DCT circuits 55 and 63 are subjected to zigzag scanning in the frame memories 56 and 64, respectively, and are supplied to the quantization circuits 57 and 65 and to the block activity calculators 58 and 66. The luminance and color difference block activities YBa and CBa are obtained by the block activity calculators 58 and 66 and are supplied to the frame activity calculator 59.

The frame activity calculator 59 obtains the frame activities YFa and CFa, the allocation bit counts YFb and CFb, and the parameter $\alpha$. The parameter $\alpha$ is supplied to the quantization tables 61 and 68, and the data from the quantization tables 61 and 68 are converted on the basis of the parameter $\alpha$. The resultant data are respectively supplied to the quantization circuits 57 and 65. The quantization circuit 57 and 65 quantize the DCT coefficients on the basis of the outputs from the quantization tables 61 and 68, thus reducing the bit rate.

As shown in FIG. 3, the outputs from the quantization circuit 57 are input to the low-frequency encoder 71 and the zero-run/Amp calculating section 83, while the outputs from the quantization circuit 65 are input to the low-frequency encoder 76 and the zero-run/Amp calculating section 86. The low-frequency encoders 71 and 76 encode the low-frequency signal components into fixed-length codes, temporarily store them, and transmit them to the multiplexing section 90 at a predetermined period. Meanwhile, the zero-run/Amp calculating sections 83 and 86 calculate zero-run and Amp data from the quantized high-frequency component data, and output them to the Huffman coding section 85, the non-zero coefficient coding section 84, the Huffman coding section 88, and the non-zero coefficient coding section 87. In this case, the code amounts of the respective blocks are controlled by the code amount allocation circuits 73 and 74.

The Huffman coding sections 85 and 88 convert the zero-run/Amp data combinations into Huffman codes by referring to the Huffman table. The non-zero coefficient coding sections 84 and 87 encode the non-zero coefficients by using the Amp data. These Huffman codes and non-zero coefficient data codes are supplied to the multiplexing section 90. The header section 89 calculates the macroblock address MBA and the macroblock pointer MBP from the code length L of each macroblock and outputs the data to the multiplexing section 90. The multiplexing section 90 performs time-division multiplexing of the input data with a predetermined format, and outputs the resultant data. FIG. 6 shows this data format.

The first transmission sequence packet circuit 77 (see FIG. 1) of the multiplexing section 90 sequences the low-frequency components of luminance and color difference signals. Meanwhile, the high-frequency components of the luminance and color difference signals are supplied to the second transmission sequence packet circuit 79 to be sequenced in units of blocks or variable-length codes. The low- and high-frequency components and the header information are multiplexed by the MUX 80. In this case, as shown in FIG. 6, each data is constituted by a synchronization/ID portion 115 indicating additional information such as a sync signal, a frame number, the parameter $\alpha$ etc., a header portion 116, a DC data portion 117 indicating low-frequency component data, and an AC data portion 118 indicating high-frequency component data. The header portion 116 is constituted by an MBA portion 119 indicating the start macroblock address of AC data included in the correction series of the data, an MBP portion 120 indicating the start of the AC data, and a CRC portion 121 as an error check code for the MBA portion 119 and the MBP portion 120. This header portion 116 is arranged at a predetermined period to form a fixed-length header block constituted by the header portion 116, the DC data portion 117, and the AC data portion 118.

The DC data portion 117 is arranged after the header portion 116. In the DC data portion 117, a predetermined number of MD portions 122 (MD1, MD2, . . . ) representing DC data corresponding to one macroblock are arranged. Note that the MD portion 122 is constituted by four blocks, i.e., DC data Y1d and Y2d corresponding to predetermined two blocks (Y1 and Y2) of the luminance system, and DC data Cbd and Crd corresponding to predetermined two blocks (Cb and Cr) of the color difference system.

In this embodiment, the DC data portion 117 and the AC data portion 118 are separately arranged in this manner. As described above, DC data is fixed-length data and is recorded in the DC data portion 117 at a predetermined period. Although the DC data portion 117 is arranged next to the header portion 116 in FIG. 6, it may be arranged independently of the header portion 116 at a predetermined period.

In contrast to this, AC data in the AC data portion 118 is variable-length data. As shown in FIG. 7, in the AC data portion 118, a plurality of MA portions 125 (MA1, MA2, . . . ) representing AC data corresponding to one macroblock are arranged. The number of MA portions 125 is changed in accordance with the length of the header portion 116 and the code length of each macroblock. The data of the later half of the last MA portion 125 of the AC data portion 118 may be inserted in an MA portion of the next header block.

Each MA portion 125 is constituted by an L portion indicating the AC data length of a macroblock, a Y1h portion indicating the Huffman codes of a Y1 block, an end code $E_{OB}$ portion indicating the end of the Huffman codes, a Y2h portion indicating the Huffman codes of a Y2 block, an end code $E_{OB}$ portion indicating the end of the Huffman codes, a Cbh portion indicating the Huffman codes of a Cb block, an end code $E_{OB}$ portion indicating the end of the Huffman codes, a Crh portion indicating the Huffman codes of a Cr block, an end code $E_{OB}$ portion indicating the end of the Huffman codes, an end code $E_{OM}$ portion indicating the end of the Huffman codes of the macroblock, Y1K and Y2k portions indicating the non-zero coefficient data codes of the Y1 and Y2 blocks, and Cbk and Crk portions indicating the non-zero coefficient data codes of the Cb and Cr blocks. In each Huffman code portion, Huffman codes hc1, hc2, . . . hcn corresponding to each data are inserted. In addition, in each non-zero coefficient data code portion, non-zero coefficient data codes kc1, kc2, . . . kcn are inserted.

On the decoding side, as shown in FIG. 4, the coded data (reproduction data) are subjected to error correction in the error detection/correction circuit 91 and are supplied to the signal separation circuit 92. The signal separation circuit 92 separates the input data into low-frequency component data, high-frequency component data, the header portion, and the parameter α included in the synchronization/IP portion, and output them. The low-frequency component data is decoded and separated into luminance components and color difference components and are respectively supplied to the luminance component reproduction circuit 99 and the color difference component reproduction circuit 100.

Meanwhile, the header portion is input to the header signal decoder 95 to be decoded, whereas the high-frequency component data is input to the variable-length decoder 94 to be decoded. The header signal decoder 95 obtains the macroblock address MBA, the macroblock pointer MBP, and the code length L from the header portion, and outputs the obtained data to the Huffman coding section 96. The Huffman coding section 96 starts decoding processing on the basis of these data, and stops it upon detection of the $E_{OB}$ or $E_{OM}$ portion. The Huffman decoding section 96 outputs the zero-run and Amp data of each block to the zero-run/Amp decoding sections 97 and 98 of the luminance and color difference systems. The zero-run/Amp decoding sections 97 and 98 separate the non-zero coefficient data codes from the Huffman codes by using the Amp data, and combine the Amp data with the non-zero coefficient data codes to obtain non-zero coefficients. In addition, the sections 97 and 98 form high-frequency component data (zero data) on the basis of the zero-run data, and decode all the data of the high-frequency components. The resultant data are supplied to the luminance component reproduction circuit 99 and the color difference component reproduction circuit 100.

The luminance component reproduction circuit 99 and the color difference component reproduction circuit 100 convert the low- and high-frequency luminance and color difference data into the original frequency signals. The circuits 99 and 100 sequentially arrange the signals, starting from the low-frequency signals, and output them to the bit rate restoration circuit 101 in the same manner as in the recording mode. As shown in FIG. 5, the irreversible quantization circuits 102 and 103 of the bit rate restoration circuit 101 perform irreversible quantization on the basis of the outputs from the irreversible quantization tables 104 and 105, respectively, thus restoring DCT coefficient data. These DCT coefficient data are supplied to the IDCT circuits 108 and 109 through the block memories 106 and 107, respectively, to be subjected to inverse DCT processing. The frame memories 110 and 111 convert the decoded block data into field data. The outputs from the frame memory 111 are input to the MUX 112, and the time-division multiplexed color difference signals Cr and Cb are separately output.

As described above, in this embodiment, the Huffman codes and non-zero coefficient data codes of high-frequency components are separately recorded by the transmission signal packet circuit 81 in the coding mode. In the prior art, since Huffman codes and non-zero coefficient data codes are continuously arranged, if an error is caused in a Huffman code, all the subsequent data cannot be reproduced. In contrast to this, according to the present invention, since Huffman codes and non-zero coefficient data codes are separately recorded, error propagation can be reduced.

Figure 8:
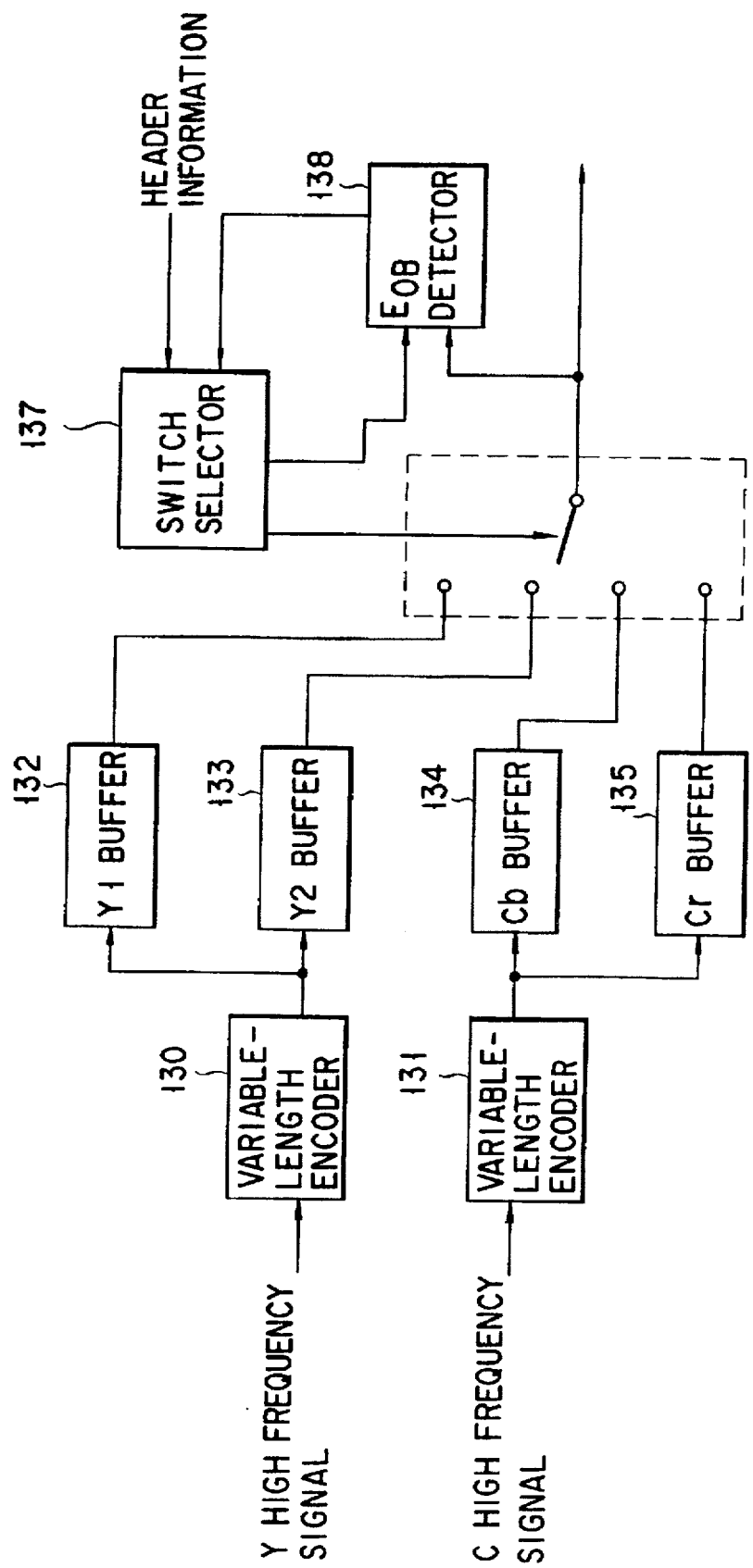
FIG. 8 is a block diagram showing another embodiment of the present invention.

FIG. 8 is a block diagram showing the coding side of a high efficiency coding signal processing apparatus according to another embodiment of the present invention.

Although FIG. 8 only shows portions corresponding to the high-frequency encoders 72 and 75 and the second transmission sequence packet circuit 79 in FIG. 1, the arrangements of other portions are the same as those in FIG. 1.

Figures 9, 11A, 11B, 11C:
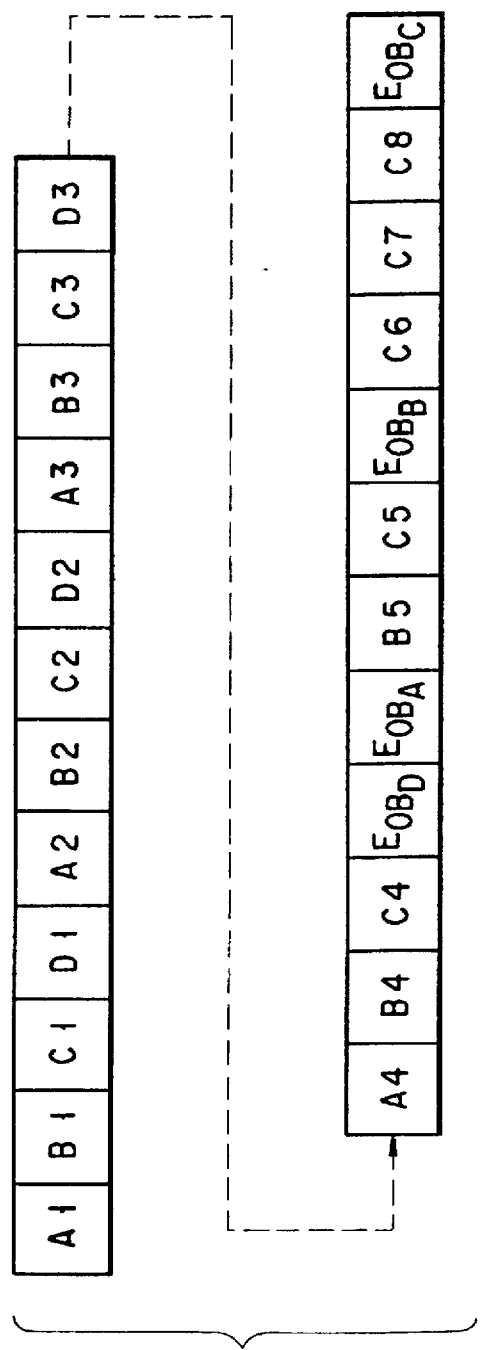
FIG. 9 is a view showing a data format employed in the embodiment shown in FIG. 8.
FIGS. 11A to 11C are views showing data formats to explain still another embodiment of the present invention.

A data format used in this embodiment will be described first with reference to FIG. 9. FIG. 9 corresponds to FIG. 37. As described above, in the prior art, the data of each block of quantized outputs are sequentially arranged, starting from low-frequency data, and the data are sequentially transmitted in units of blocks Y1, Y2, Cb, and Cr. In contrast to this, in this embodiment, the data of all the blocks Y1, Y2, Cb, and Cr constituting a macroblock are sequentially transmitted, starting from low-frequency components. That is, as shown in FIG. 9, data A1, B1, C1, D1 (see FIG. 37), each having the lowest frequency in a corresponding block, are sequentially arranged, and data A2, B2, C2, and D2 are sequentially arranged. Subsequently, the low-frequency components of all the blocks are transmitted prior to the high-frequency components in this manner.

Referring to FIG. 8, the high-frequency signals of quantized luminance components output from a bit rate reduction circuit (see FIG. 1) are input to a variable-length encoder 130, and the high-frequency signals of color difference signals are input to a variable-length encoder 131. The variable-length encoders 130 and 131 obtain zero-run and Amp data and form Huffman codes and non-zero coefficient data codes. The variable-length encoders 130 and 131 respectively output the formed data to a Y1 buffer 132, a Y2 buffer 133, a Cb buffer 134, and a Cr buffer 135. During the interval in which the signals of the Y1 block, of the luminance blocks Y1 and Y2 and the color difference blocks Cb and Cr, are input, the corresponding variable-length data is stored in the Y1 buffer 132. Similarly, during a Y2 block calculating operation, the calculation result is stored in the Y2 buffer 133. Similarly, in the color difference system, the outputs from the variable-length encoder 131 are respectively stored in the Cb buffer 134 and the Cr buffer 135. In this manner, the data of one macroblock are separately stored in the buffers 132 to 135.

Data from the respective buffers 132 to 135 are output through a switch 136. The switch 136 is controlled by a switch selector 137 to selectively output the data from the buffers 132 to 135. The switch selector 137 receives header information and is designed to inhibit the switch 136 from selecting the buffers 132 to 135 during the interval in which the header information is inserted. The switch selector 137 switches the switch 136 in units of quantized outputs of the respective blocks. With this operation, data are sequentially read out from the buffers 132, 133, 134, 135, 132, ... in this order to be output to an MUX 80 (see FIG. 1). The outputs from the switch 136 are multiplexed with header information and low-frequency component data by the MUX 80, and parity is added to the resultant data.

Figure 10:
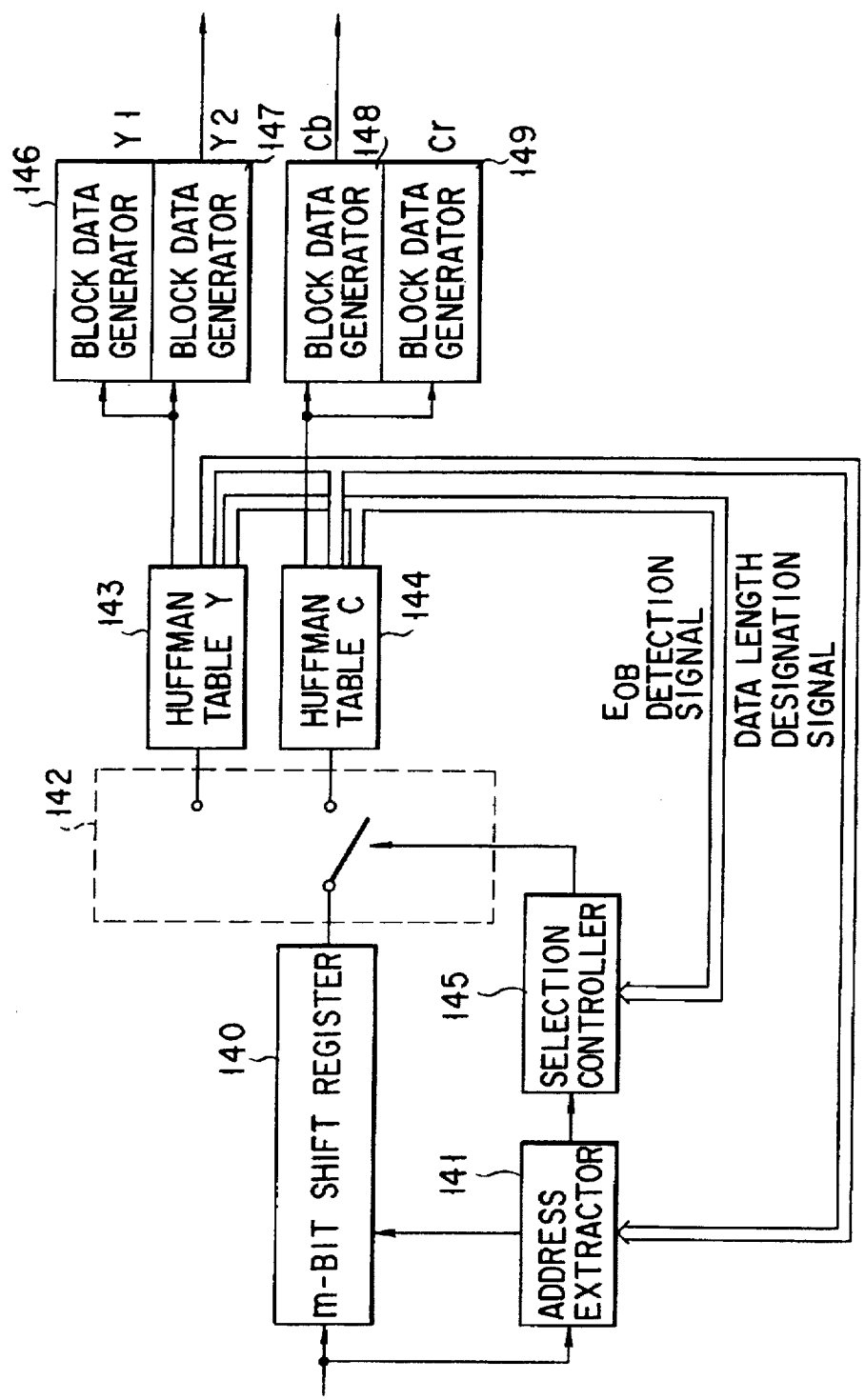
FIG. 10 is a block diagram showing the arrangement on the decoding side corresponding to the embodiment in FIG. 8.

The outputs from the switch 136 are also supplied to an $E_{OB}$ detector 138. Upon detection of an end code $E_{OB}$, the $E_{OB}$ detector 138 outputs a detection signal to the switch selector 137. Since the respective blocks have different code counts, a buffer for which a data read operation is completed is determined by detecting the code $E_{OB}$. When the detection signal indicates that a read operation is completed for a given buffer, the switch selector 137 controls the switch 136 not to select the buffer in the subsequent operation. FIG. 10 is a block diagram showing the arrangement of the decoding side of the apparatus. Although FIG. 10 shows only a portion corresponding to the variable-length data decoder 94 in FIG. 4, the arrangements of other portions are the same as those in FIG. 4.

High-frequency signals from the signal separation circuit 92 (see FIG. 4) are input to an m-bit shift register 140 and an address extractor 141. The m-bit shift register 140 serves as a buffer for extracting variable-length data. Outputs from the m-bit shift register 140 are supplied to Huffman tables 143 and 144 through a switch 142. The Huffman tables 143 and 144 detect the $E_{OB}$ codes and output the $E_{OB}$ detection signals to a selection controller 145, and at the same time output data length designation signals indicating data lengths to the address extractor 141.

The address extractor 141 calculates the positions of the input variable-length data on the basis of the data length designation signals, and designates the data positions to the m-bit shift register 140. The selection controller 145 checks on the basis of the outputs from the address extractor 141 and the EOB detection signals whether the respective variable-length data are luminance components or color difference components, and controls the switch 142 accordingly with this operation, the luminance components are input to the Huffman table 143, while the color difference components are input to the Huffman table 144.

The Huffman tables 143 and 144 decode Huffman codes and output the high-frequency components of the respective blocks to block data generators 146 to 149. The block data generators 146 to 149 respectively form the block data of the blocks Y1, Y2, Cb, and Cr and output them to the luminance component reproduction circuit 99 and the color difference component reproduction circuit 100 (see FIG. 4).

An operation of the high efficiency coding signal processing apparatus having the above-described arrangement will be described next.

On the coding side, Huffman codes and non-zero coefficient data codes are formed by the variable-length encoders 130 and 131. The variable-length data of the Y1, Y2, Cb, and Cr blocks are respectively supplied to the buffers 132 to 135. The switch selector 137 controls the switch 136 to switch/select the buffers 132 to 135 so as to sequentially read out the data of the respective blocks, starting from low-frequency component data. With this operation, the data A1, B1, C1, D1, A2, ... (see FIG. 37) are sequentially read out and output in this order, as shown in FIG. 9.

The $E_{OB}$ detector 138 detects the end of each block data by detecting the $E_{OB}$ code. Upon reception of the $E_{OB}$ code detection signal, the switch selector 137 stops subsequent selection of a block for which a read operation is completed. Referring to FIG. 37, the Cr block has the shortest data length. For this reason, as shown in FIG. 9, after data C4 of the Cb block is read out, an end code $E_{OBD}$ of the Cr block is detected first. An end code $E_{OBA}$ of the Y1 block is then detected. Subsequently, only the Y2 and Cb buffers 133 and 134 are selected. Similar processing is repeated afterward, and the processing is completed upon detection the $E_{OB}$ codes of all the blocks. Note that the switch selector 137 inhibits the switch 136 from selecting the buffers 132 to 135 during the interval in which header information is inserted.

On the decoding side, reproduction signals of high-frequency components are input to the Huffman tables 143 and 144 of the luminance and color difference systems through the m-bit shift register 140 and the switch 142. The Huffman tables 143 and 144 decode Huffman codes. At the same time, the Huffman tables 143 and 144 detect the $E_{OB}$ codes and output the $E_{OB}$ detection signals to the selection controller 145. In addition, the tables 143 and 144 output data length designation signals to the address extractor 141. The address extractor 141 calculates the position of the data on the basis of the input reproduction signals and the data length designation signals, and designates the data positions to the m-bit shift register 140. The m-bit shift register 140 outputs the data based on this designation through the switch 142. The selection controller 145 checks on the basis of the $E_{OB}$ detection signals whether the respective data are luminance components or color difference components, and switches the switch 142 accordingly. With this operation, the data of the luminance blocks Y1 and Y2 are supplied to the Huffman table 143, while the data of the color difference blocks Cb and Cr are supplied to the Huffman table 144. The data decoded by the Huffman tables 143 and 144 are supplied to the block data generators 146 to 149. The block data generators 146 to 149 form and output the high-frequency component data of the Y1, Y2, Cb, and Cr blocks.

As described above, in this embodiment, outputs from the buffers 132 to 135 are selected on the coding side to arrange data, starting from low-frequency components with primary priority, and the m-bit shift register 140 is controlled by the address extractor 141 on the decoding side, thereby restoring data in units of blocks. With this processing, the probability of reproduction of the low-frequency components of each block is increased.

Note that the Huffman code tables of the luminance and color difference systems may differ from each other. In this case, sequencing is independently performed in the luminance system and in the color difference system. FIGS. 11A to 11C are views for explaining data formats in such a case. As shown in FIG. 11A, in the luminance system, the data A1, B1, A2, B2, ... are arranged in this order. In the color difference system, as shown in FIG. 11B, the data C1, D1, C2, D2, ... are arranged in this order. As shown in FIG. 11C, these data are arranged and output in the order of luminance system data (a) and color difference data (b).

Figure 12:
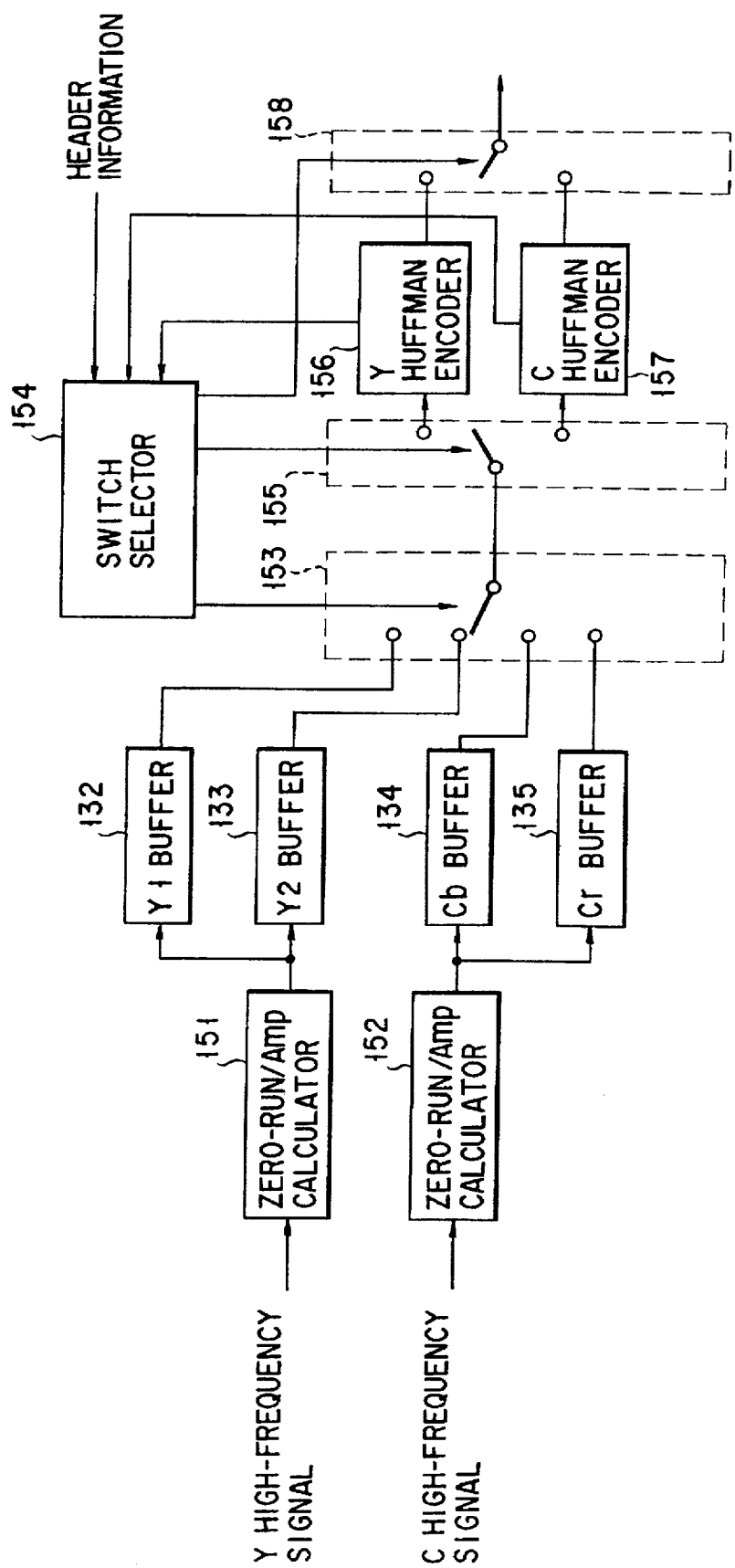
FIG. 12 is a block diagram showing an arrangement for realizing the data formats shown in FIGS. 11A to 11C.

FIG. 12 is a block diagram showing an arrangement for realizing the data formats in FIGS. 11A to 11C. The same reference numerals in FIG. 12 denote the same parts as in FIG. 8, and a description thereof will be omitted.

The high-frequency components of luminance and color difference signals are respectively input to zero-run/Amp calculators 151 and 152. Zero-run data, Amp data, and non-zero coefficient data codes from the zero-run/Amp calculators 151 and 152 are stored in the buffers 132 to 135. A switch 153 is controlled by a switch selector 154 to selectively output the data in the buffers 132 to 135. Data from the switch 153 are output to a luminance (Y) Huffman encoder 156 and a color difference (C) Huffman encoder 157 through a switch 155. The switch selector 154 controls the switch 155 to supply luminance signals to the Y Huffman encoder 156, and color difference signals to the C Huffman encoder 157. The Huffman encoders 156 and 157 convert the input data into Huffman codes and output the codes to a switch 158. The switch 158 is controlled by the switch selector 154 to selectively output the Huffman codes of the luminance system and the Huffman codes of the color difference system. The switch selector 154 controls the switches 153, 155, and 158 on the basis of the $E_{OB}$ codes of the respective block data.

In the embodiment having the above-described arrangement, the zero-run data, Amp data, and non-zero coefficient data codes, constituted by fixed-length codes, of the respective blocks are stored in the buffers 132 to 135. The switches 153 and 155 are switched by the switch selector 154 to sequentially supply the data to the Huffman encoders 156 and 157, starting from low-frequency components. The data input to the Huffman encoders 156 and 157 are converted into Huffman codes. The Huffman codes are then output to the switch 158, and at the same time the $E_{OB}$ signal of each block is output to the switch selector 154. With this operation, the switch selector 154 controls the switches 153 and 155 to inhibit selection of a buffer for which a read operation is completed. The switch 158 is controlled by the switch selector 154 to selectively output the Huffman codes of the luminance system and the Huffman codes of the color difference system. As a result, data strings having the formats shown in FIGS. 11A to 11C can be obtained.

FIG. 13 is a block diagram showing the decoding side of a high efficiency coding signal processing apparatus according to still another embodiment of the present invention. The same reference numerals in FIG. 13 denote the same parts as in FIG. 4, and a description thereof will be omitted. The arrangements of portions omitted from FIG. 13 are the same as those shown in FIG. 4.

Coded data is input to an error detection/correction circuit 91. The error detection/correction circuit 91 is designed to perform error detection and add an error flag to data which cannot be corrected. A signal separation circuit 92 separates the high-frequency components from the data supplied from the error detection/correction circuit 91 and outputs them to a variable-length data decoder 94. A decoding error detector 161 receives an error flag from the error detection/correction circuit 91, a macroblock address MBA, a macroblock pointer MBP, and the like from a header signal decoder 95, and decoded outputs and data length L from the variable-length decoder 94.

The decoding error detector 161 checks on the basis of the input data whether the data to be decoded is valid, and outputs the determination signal to an inhibition control signal generator 162. The inhibition control signal generator 162 supplies an inhibition control signal to a data "0" replacer 163. The data "0" replacer 163 is designed to replace data from the variable-length data decoder 94 with "0" upon reception of the inhibition control signal, and output the resultant data.

An operation of the embodiment having the above-described arrangement will be described next with reference to FIGS. 14A and 14B to FIG. 17.

FIG. 14A shows the data format of a macroblock. Referring to FIG. 14A, Y1, Y2, Cb, and Cr block data are sequentially arranged after code length data L in the order named. The high-frequency components of these data are input to the variable-length data encoder 94 through the signal separation circuit 92. The variable-length data decoder 94 sequentially decodes and outputs data A1, A2, . . . shown in FIG. 14B. Assume that no error flag is output from the error detection/correction circuit 91, and that decoding can be performed up to data B2 of the Y2 block, but data B3 cannot be decoded, as indicated by the cross in FIG. 14B. That is, assume that the zero-run/Amp data combinations of the data B3 and the subsequent data do not correspond to any Huffman codes. In this case, it cannot be determined whether an error is caused in the data B3 or the subsequent data or in the data B2 or the previous data. That is, even if an error is caused in the data B2 or the previous data, the corresponding data is erroneously determined as another Huffman code, resulting in a decoding error of the data including the data B3.

For this reason, in this embodiment, data immediately before data which cannot be decoded is determined as invalid data. More specifically, when the decoding error detector 161 detects a decoding error of the data B3, it determines that the data B2 is invalid data, and outputs the determination signal to the inhibition control signal generator 162. The inhibition control signal generator 162 outputs an inhibition control signal to the data "0" replacer 163 at the timing of the data B2. The data "0" replacer 163 also receives the output from the variable-length data decoder 94. In response to the inhibition control signal, the data "0" replacer 163 replaces the data B2 and the subsequent data with "0"s and outputs the resultant data. FIGS. 15A and 15B respectively show the data of the luminance blocks Y1 and Y2 in this case. As shown in FIG. 15B, only the low-frequency data of the luminance block Y2 are output as valid data.

Note that if all the data are decoded, and no error flag is output from the error detection/correction circuit 91, a decoding permission flag may be transmitted to be used for interpolation or the like.

Assume that an error in decoded data is detected by the error detection/correction circuit 91, and an error flag is output. The cross in FIG. 16B indicates that an error flag is output. As shown in FIG. 16C, data A1 to A5 are normal data. Note that FIG. 16A is identical to FIG. 14A. In this case, since the reliability of the data A1 to A5 is high, the decoding error detector 161 determines that decoded outputs immediately before the error flag are valid. In accordance with the determination result from the decoding detector 161, the inhibition control signal generator 162 generates an inhibition control signal and outputs it to the data "0" replacer 163. With this operation, the data "0" replacer 163 replaces the data after the data A5 with "0"s and outputs the resultant data, as shown in FIGS. 17A and 17B.

As described above, in this embodiment, the validity of each decoded output is determined in accordance with the presence/absence of an error flag. If no error flag is generated, and given data cannot be decoded, data immediately before the data which cannot be decoded is made invalid to prevent a deterioration in image quality. Note that the replacement of all invalid data with "0"s is equivalent to a case wherein a quantized output from a quantization circuit is "0" when an input is small. Therefore, with such replacement, only high-frequency components are lost, and hence in this embodiment, image patterns can be identified.

FIG. 18 is a block diagram showing the decoding side of a high efficiency coding signal processing apparatus according to still another embodiment of the present invention. The same reference numerals in FIG. 18 denote the same parts as in FIG. 13, and a description thereof will be omitted.

This embodiment is different from the one shown in FIG. 13 in that a data length estimation circuit 165 is arranged in place of the inhibition control signal generator 162 and the data "0" replacer 163. That is, an output from a decoding error detector 161 is input to the data length estimation circuit 165.

As places in which errors may be caused, three types of portions, i.e., a portion of a data length L, a portion of variable-length codes Y1, Y2, Cr, and Cb, and a portion of an end code $E_{OB}$, are considered. In any portion, if an error is caused, data following the error data cannot be decoded. In the embodiment shown in FIG. 13, by referring to the data length L of the macroblock, the start position of the next macroblock is detected, and decoding is resumed from the next macroblock. In this case, even if an error is caused in only the Y1 block and other block data are correct, decoding is not performed.

In contrast to this, in this embodiment, the data length of an error block is estimated on the basis of the correlation in data length between adjacent blocks to determine the start position of each block, thus determining on the basis of the validity of each decoding result whether to use decoded data. Upon reception of an error flag from the decoding error detector 161, the data length estimation circuit 165 estimates the data length of the error block and designates the start position of the next block data to a variable-length data decoder 94.

Figure 19:
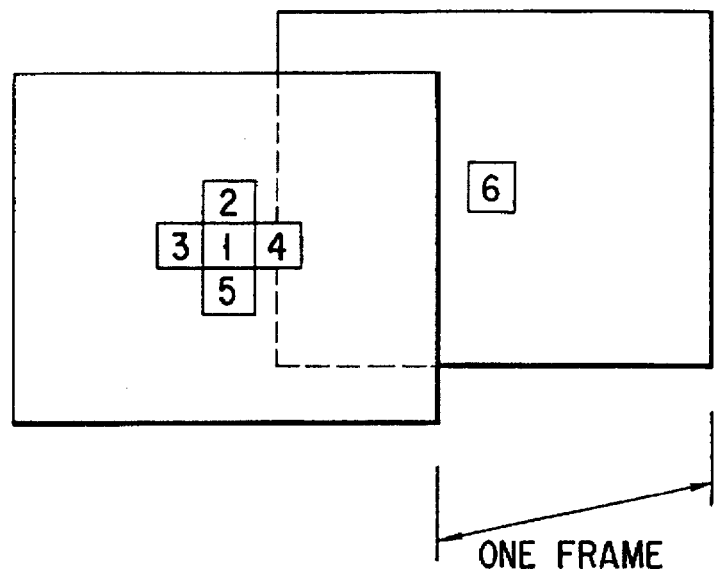
FIG. 19 is a view for explaining an operation of the embodiment shown in FIG. 18.

Note that the data length estimation circuit 165 performs estimation on the basis of the data of adjacent macroblocks, as shown in FIG. 19. Referring to FIG. 19, reference numeral 1 denotes a macroblock in which an error is caused; 2, 5, 3, and 4, upper, lower, left, and right macroblocks with respect to the macroblock 1; and 6, a macroblock located one frame ahead of the macroblock 1 at the same position. The data length of the error macroblock is estimated by using at least one of these macroblocks 2 to 6. FIG. 20 is a flow chart for explaining logic determination performed by the data length estimation circuit 65.

In step S1, the data length estimation circuit 165 compares the data lengths L of adjacent macroblocks. With this operation, the correlation between the adjacent macroblocks is roughly determined. If the data lengths L of all the adjacent macroblocks are greatly different from each other, it is determined that no correlation exists. In contrast to this, if the difference between the data lengths L falls within a predetermined range, it is determined that high correlation exists and estimation can be performed.

In step S2, data lengths l of the respective blocks of adjacent macroblocks are compared with each other. If the difference between the data lengths l falls within a predetermined range, it is determined that high correlation exists and estimation can be performed. In step S3, it is checked whether the data lengths l of the respective blocks of adjacent macroblocks coincide with each other. If YES in step S3, it is determined that the data length l of the error block has the same value, and the flow advances to step S5. If NO in step S3, the data length l is estimated in step S4.

In step S4, the data length l is estimated from decoded data (macroblocks 6, 2, and 3 of the previous frame). In this case, for example, the weighted means method is employed.

In step S5, the end position (estimated point) of the error block is determined on the basis of the results obtained in steps S3 and S4. In this case, an allowable range of ±Δx bit length may be set. In step S6, an end code $E_{OB}$ is searched at the estimated point. If data coinciding with the end code $E_{OB}$ is detected (step S7), this data is assumed to be the end code $E_{OB}$ to determine the start position of a block next to the error block, thus starting a decoding operation. If two end codes $E_{OB}$ are detected, the $E_{OB}$ points are respectively determined in steps S8 and S9 to start a decoding operation. In this case, decoding operations may be simultaneously performed by using two decoders or may be performed in a time-serial manner.

In steps S10 and S11, it is checked whether a decoding error has occurred. In step S12, the start position of the next block is determined. More specifically, it is checked in advance whether no error flag exists halfway in a macroblock to be decoded. In addition, only when the macroblock is completely decoded, and no decoding error is caused, the decoded data is regarded as valid data. In contrast to this, if a decoding error is caused, the decoded data is regarded as invalid data.

Figure 21:
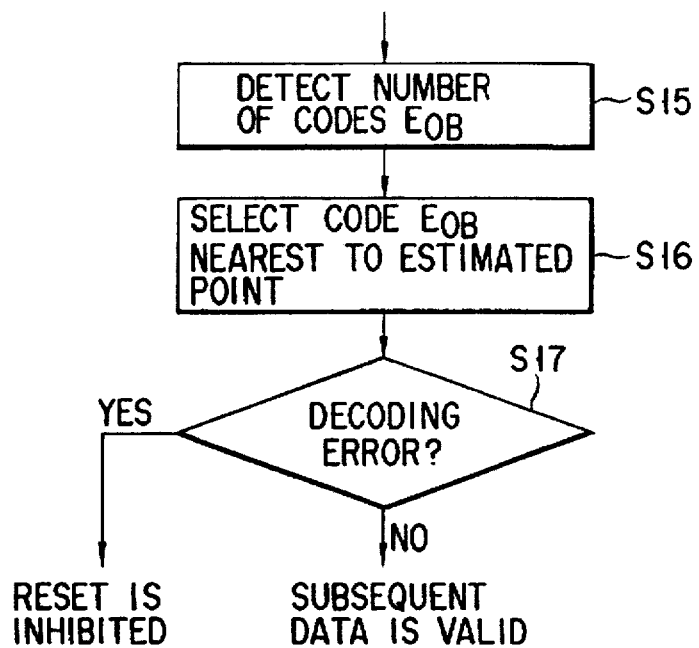
FIG. 21 is a flow chart for explaining an operation of the embodiment shown in FIG. 18.

FIG. 21 shows processing to be performed when a plurality of end codes $E_{OB}$ are detected at the estimated point.

In step S15, the number of detected end codes $E_{OB}$ is obtained. In step S16, one end code $E_{OB}$ nearest to the estimated point is employed on the basis of the obtained number. Decoding is started from data next to this end code $E_{OB}$. In step S17, the presence/absence of a decoding error is determined. If a decoding error is caused, it is determined that decoding cannot be performed. If not error is caused, decoding is continued.

An operation of the embodiment having the above-described arrangement will be described below with reference to FIGS. 22 and 23.

As shown in FIG. 22, assume that a macroblock is constituted by the data length L, the luminance blocks Y1, Y2, the color difference blocks Cb and Cr, and the end code $E_{OB}$, and that these data including the code $E_{OB}$ respectively have data lengths lL, l1, l2, lb, and lr. As indicated by the cross in FIG. 23, assume that an error flag is added to the luminance block Y1. FIG. 23 shows the luminance block Y1 in detail, with the cross indicating the occurrence of an error.

Upon reception of an error flag from the decoding error detector 141, the data length estimating circuit 165 obtains the block length l in accordance with the flow chart in FIG. 20. If it is estimated with this processing that the luminance block has a data length l1', the data estimation circuit 165 searches for the end code $E_{OB}$ between the start position of the luminance block Y1 and a position near (±Δx) a position l1' (estimated point). Assume that the code $E_{OB}$ is "101", and a portion near the end position of the Y1 block has the data arrangement shown in FIG. 23.

Two data strings identical to the code $E_{OB}$ are present near the estimated point. The data estimation circuit 165 outputs these two data strings, as first and second $E_{OB}$ data, to the variable-length data decoder 94. The variable-length data decoder 94 starts decoding while assuming that data next to these two $E_{OB}$ data are located at the start position of the Y2 block. Decoded outputs from the variable-length decoder 94 are supplied to the decoding error detector 161. The decoding error detector 161 detects a decoding error and outputs it to the data length estimation circuit 165. The data length estimation circuit 165 determines that one decoded output in which no decoding error is caused is valid, and outputs this decoded output to luminance component and color difference reproduction circuits (not shown).

As described above, in this embodiment, the data length estimating circuit 165 estimates the data length of an error block to obtain the start position of the next block. Since the data of the next block can be decoded sometimes, error propagation can be suppressed.

FIG. 24 is a block diagram showing the decoding side of a high efficiency coding signal processing apparatus according to still another embodiment of the present invention. The same reference numerals in FIG. 24 denote the same parts as in FIGS. 4, 13, and 18, and a description thereof will be omitted. This embodiment is designed to interpolate low-frequency components.

This embodiment is different from those shown in FIGS. 4, 13, and 18 in that an error processor 170 and buffer memories 175 and 176 are arranged. An output 10 from a low-frequency signal decoder 93 is supplied to a luminance component reproduction circuit 99 and a color difference component reproduction 100 through the error processor 170. An output from the luminance component reproduction circuit 99 is supplied to a bit rate restoration circuit 101 and the buffer memory 175. An output from the color difference reproduction circuit 100 is supplied to the bit rate restoration circuit 101 and the buffer memory 176. Outputs from the buffer memories 175 and 176 are supplied to the error processor 170.

Note that the low-frequency component of a DCT transform coefficient is the average value of a block and is very important. If low-frequency components are fixed-length data or encoded to reduce error propagation, interpolation using adjacent blocks can be performed. If data is arranged in units of pixels, interpolation can be easily performed by using the values of adjacent pixels. In the system for performing frequency transform of blocks, however, it is very difficult to determine correlation with respect to the average value of 8×8=64 pixels. Therefore, in this embodiment, correlation determination is performed by comparing the values of low- and high-frequency components of adjacent blocks with each other in units of frequency components, thereby obtaining interpolation values.

An error flag from an error detection/correction circuit 91 is supplied to an interpolation control signal generator 171 of the error processor 170. A low-frequency signal from the low-frequency decoder 93 is output to an interpolation signal generator 172 and a delay circuit 173. The interpolation control signal generator 171 detects a block having an error on the basis of the error flag, and designates the error block to the interpolation signal generator 172. Meanwhile, the luminance data and color difference data of the low-and high-frequency components of the respective adjacent blocks are stored in the buffer memories 175 and 176, respectively. These data are also supplied to the interpolation signal generator 172.

The interpolation signal generator 172 compares the data of the low-frequency components of the adjacent blocks with each other, and also compares the high-frequency components in units of frequency components. If it is determined from these comparison results that the trends of the data of the adjacent blocks coincide with each other, an interpolation value is obtained by the proportional allocation of the adjacent block data. If the trends do not coincide with each other, the block data of the previous frame is output as an interpolation value.

The interpolation value generated in this manner is supplied to an MUX 174. The delay circuit 173 is designed to adjust the timing at which an output from the low-frequency signal decoder 93 is supplied to the MUX 174. The MUX 174 is controlled by the interpolation control signal generator 171, replaces the data from the delay circuit 173 with the interpolation value from the interpolation signal generator 172, and outputs the resultant data to the luminance component reproduction circuit 99 and the color difference component reproduction circuit 100.

An operation of the embodiment having the above-described embodiment will be described below.

The data which has undergone error correction processing in the error detection/correction circuit 91 is separated into low- and high-frequency signals by the signal separation circuit 92. The low-frequency signal is decoded by the low-frequency signal decoder 93 and is supplied to the interpolation signal generator 172 and the delay circuit 173. The interpolation signal generator 172 also receives the data of adjacent blocks from the buffer memories 175 and 176. As adjacent blocks, for example, the upper and left block data 2 and 3 and the block data 6 of the previous frame shown in FIG. 19 are used. The interpolation signal generator 172 compares the low-frequency components of the block data 2, 3, and 6 with each other, and also compares the high-frequency components in units of frequency components, thus determining the trends of the respective data. If the trends coincide with each other, the proportional allocation value of the block data 2, 3, and 6 is supplied, as an interpolation value, to the MUX 174. If the trends do not coincide with each other, the block data 6 is supplied, as an interpolation value, to the MUX 174. The MUX 174 interpolates each error portion of the low-frequency components by using the interpolation value from the interpolation signal generator 172.

As described above, in this embodiment, even if an error is caused in a low-frequency component, interpolation can be performed by using adjacent blocks.

Figure 25:
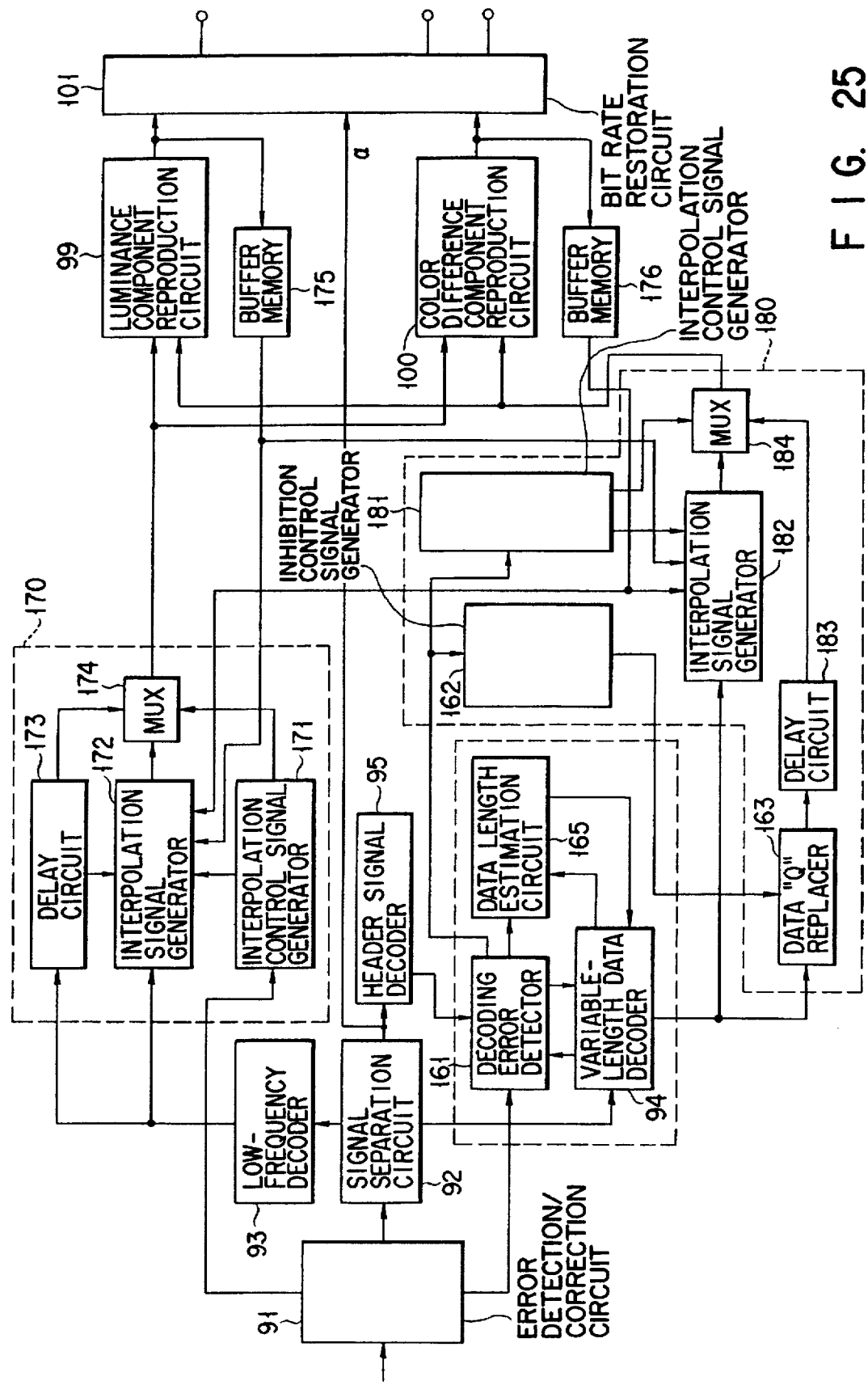
FIG. 25 is a block diagram showing still another embodiment of the present invention.

FIG. 25 is a block diagram showing still another embodiment of the present invention. The same reference numerals in FIG. 25 denote the same parts as in FIG. 24, and a description thereof will be omitted. This embodiment is designed to perform interpolation with respect to high-frequency components as well as low-frequency components.

Decoded data from a variable-length data decoder 94 is output to a luminance component reproduction circuit 99 and a color difference reproduction circuit 100 through an error processor 180. The error processor 180 has the same arrangement as that of the error processor 170. An output from a decoding error detector 161 is supplied to an interpolation control signal generator 181 of the error processor 180. The interpolation control signal generator 181 designates an error block to an interpolation signal generator 182 and an MUX 184.

The interpolation signal generator 182 receives the decoded output from the variable-length decoder 94 and the data of adjacent blocks from buffer memories 175 and 176, and determines correlation on the basis of comparison between the decoded output and the adjacent block data. The interpolation signal generator 182 obtains an interpolation value from the weighted mean of the adjacent block data when the correlation is high. When the correlation is low, the interpolation signal generator 182 outputs block data of the previous frame, as an interpolation value, to the MUX 184. In addition, if a large number of "0" data are produced upon quantization, "0" is set as an interpolation value. A delay circuit 183 receives the decoded output through a data "0" replacer 163, and adjusts the timing at which the decoded output is supplied to the MUX 184. The MUX 184 is controlled by the interpolation control signal generator 181 to replace the decoded output from the delay circuit 183 with the interpolation value from the interpolation signal generator 182. The MUX 184 then outputs the resultant data to the luminance component reproduction circuit 99 and the color difference component reproduction circuit 100.

In the embodiment having the above-described arrangement, the interpolation control signal generator 181 uses an error flag or a decoding permission flag to designate the position of a frequency component of a block in which an error is caused. The interpolation signal generator 182 compares adjacent block data of components having frequencies lower than that of the component at the position where the error is caused, and determines the correlation between the data. If the correlation is relatively high, the same value as that of these block data or weighted mean value thereof is output, as an interpolation value, to the MUX 184. If a large number of "0" data are produced upon quantization, "0" is set as an interpolation value. The MUX 184 interpolates the decoded output from the delay circuit 183 with the interpolation value, and outputs the resultant data.

As described above, in this embodiment, error data interpolation can be performed with respect to both low-and high-frequency components.

FIG. 26 is a block diagram showing still another embodiment of the present invention. The same reference numerals in FIG. 26 denote the same parts as in FIG. 25, and a description thereof will be omitted. A circuit for color difference components is omitted from FIG. 26.

This embodiment is different from that shown in FIG. 25 in that correlation determination is performed by using all the blocks 2 to 6 in FIG. 19 and interpolation of low- and high-frequency components is performed by the same circuit. More specifically, outputs from a low-frequency signal decoder 93 and a variable-length data decoder 94 are input to a luminance component reproduction circuit 99. An output from the luminance component reproduction circuit 99 is supplied to a delay circuit 173 and to an interpolation signal generator 186 through delay circuits 187 to 191. The delay circuits 187 to 191 operate with different delay times to output the upper, lower, left and right block data and the block data of the previous frame relative to an error block to the interpolation signal generator 186. The interpolation signal generator 186 uses all the input lock data to perform correlation determination. The interpolation signal generator 186 outputs the weighted mean of the upper, lower, left, and right block data or the block data of the previous frame, as an interpolation signal, to an MUX 174, on the basis of the obtained determination result.

Low- and high-frequency error flags from an error detection/correction circuit 91 are input to an interpolation control signal generator 185. The interpolation control signal generator 185 detects an error block from the error flags to control the interpolation signal generator 186.

In the embodiment having the above-described arrangement, the upper, lower, left, and right block data and the block data of the previous frame relative to the error block are input to the interpolation signal generator 186 through the delay circuits 187 to 191. With this operation, correlation determination can be performed more reliably than in the embodiment shown in FIG. 25. Other functions and effects are the same as those in the embodiment in FIG. 25.

Figure 27:
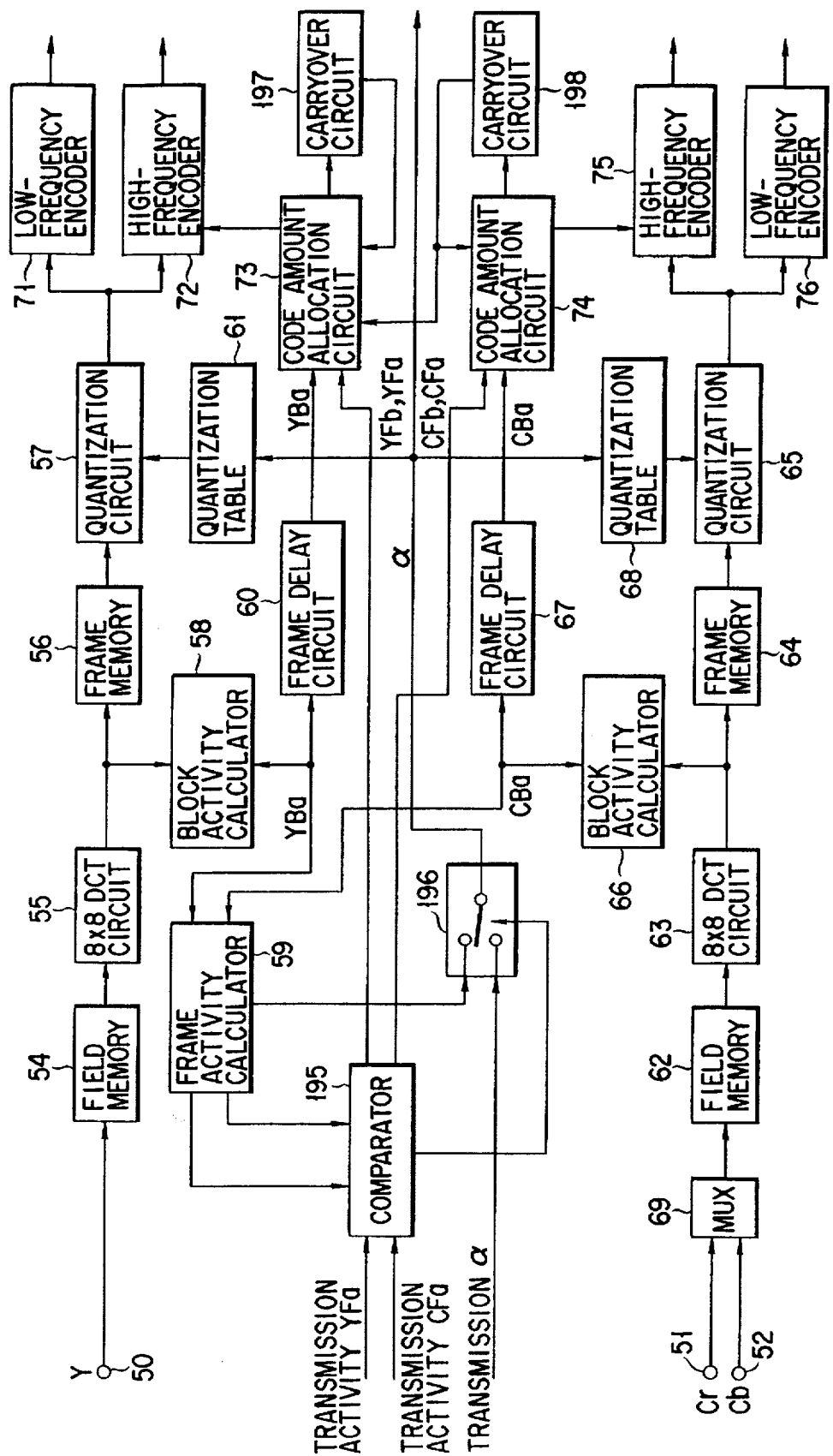
FIG. 27 is a block diagram showing still another embodiment of the present invention.

FIG. 27 is a block diagram showing still another embodiment of the present invention. The same reference numerals in FIG. 27 denote the same parts as in FIGS. 1 and 2, and a description thereof will be omitted.

This embodiment is designed to cope with repetitive coding and is different from the embodiment shown in FIGS. 1 and 2 in that a comparator 195, a switch 196, and carryover circuits 197 and 198 are added.

In the embodiment shown in FIGS. 1 and 2, a bit allocation amount and the parameter $\alpha$ for quantization are obtained by calculating activity data in units of frames. Therefore, when repetitive coding such as dubbing is to be performed, information cannot be properly reproduced in decoding unless the same data as the parameter $\alpha$ and the bit allocation amount used in the previous coding processing are used. However, if all these data are transmitted, the data amount becomes very large. In this embodiment, therefore, a bit allocation amount is obtained by using frame activity data (to be referred to as activities hereinafter) YFa and CFa and the parameter $\alpha$ (to be referred to as transmission $\alpha$ hereinafter) used in the previous decoding processing. In this case, since no block activity data are transmitted, the bit allocation becomes uneven. In consideration of this point, the embodiment is designed to use an excess of the bit allocation to calculate bit allocation for the next block. Since there is no margin in a block at the start position of each frame, a uniform bit rate and high image quality are maintained by using an excess of bit allocation.

More specifically, luminance and color difference component frame activities (to be referred to as calculation activities hereinafter) from a frame activity calculator 59 are input to the comparator 195. The comparator 195 also receives the transmission activities YFa and CFa. The comparator 195 compares the calculation activities with the transmission activities, and selects one frame activity on the basis of the comparison result. The comparator 195 then outputs the selected activity to code amount allocation circuits 73 and 74. The parameter $\alpha$ used in the previous decoding processing is input to the switch 196. The switch 196 is controlled by the comparator 195 to select and output either the parameter $\alpha$ or transmission $\alpha$ from the frame activity calculator 59 to quantization tables 61 and 68 and a transmission signal packet circuit 81 (see FIG. 1).

Meanwhile, outputs from the code amount allocation circuits 73 and 74 are respectively supplied to the carryover circuits 197 and 198. If excesses are produced in the bit allocations set by the code amount allocation circuits 73 and 74, the carryover circuits 197 and 198 output the excesses, as excess bits, to the code amount allocation circuit 73 and 74 to add them to the allocation values calculated for the next block.

Figure 28:
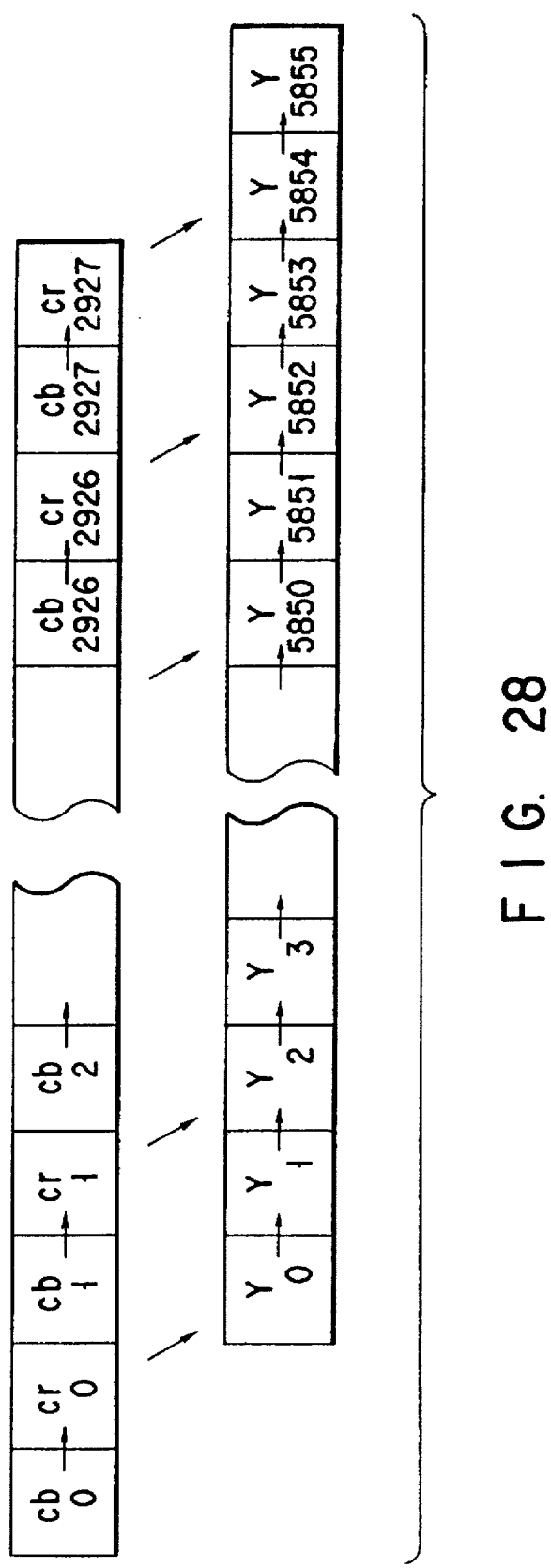
FIG. 28 is a view for explaining an operation of the embodiment shown in FIG. 27.

An operation of the embodiment having the above-described arrangement will be described below with reference to FIG. 28.

In a normal operation, with regard to both luminance and color difference components, the transmission activity data is larger than the calculation activity data calculated by the frame activity calculator 59. In this case, the comparator 195 selects the transmission activity data and outputs the data to the code amount allocation circuits 73 and 74. The bit allocation of luminance and color difference components corresponds to the ratio between the frame activities YFa and CFa. The bit allocation of each block corresponds to the ratio between the block activity YBa and the frame activity YFa. Since a bit allocation is calculated by using frame activity data different from the value calculated by the frame activity calculator 59, the bit count allocated to high-frequency components changes inevitably. In this case, since a large value is used as frame activity data, a margin (excess bits) is produced in the amount of bits which can be allocated to each block, provided that the recording rate is constant.

The excess bits in the bit allocations obtained by the code amount allocation circuits 73 and 74 are respectively supplied to the carryover circuits 197 and 198. The carryover circuits 197 and 198 supply these excess bits to the code amount allocation circuits 73 and 74 to use them for the next block, thus coping with a shortage of bits. More specifically, as shown in FIG. 28, the excess bit data of a color difference block Cb is used for a color difference block Cr in the same macroblock; the excess bit data of the color difference block Cr, a luminance block Y0 in the same macroblock; the excess bit data of the luminance block Y0, a luminance block Y1 in the same macroblock; and the excess bit data of the luminance block Y1, the luminance block Y0 in the next macroblock.

Assume that calculation activity data is larger than transmission activity data for both luminance and color difference components because of the influence of noise and the like. In this case, if the transmission data is used, the bit allocation amounts obtained by the code amount allocation circuits 73 and 74 overflow. Therefore, in this case, the calculation activity data for both luminance and color difference components is supplied to the code amount allocation circuits 73 and 74. With this operation, excess bits can be produced, and a uniform bit allocation can be obtained.

Assume next that one of the luminance frame activity YFa and the color difference frame activity CFa is larger in calculation data than in transmission data, and the other is larger in transmission data than in calculation data. In this case, the comparator 195 supplies larger frame activity data to the code amount allocation circuits 73 and 74. With this operation, excess bits can be produced. Note that as the parameter α, a transmission parameter is used.

As described above, in this embodiment, since a uniform bit allocation can be maintained even in repetitive coding processing, errors in each coding processing can be reduced.

Figure 29:
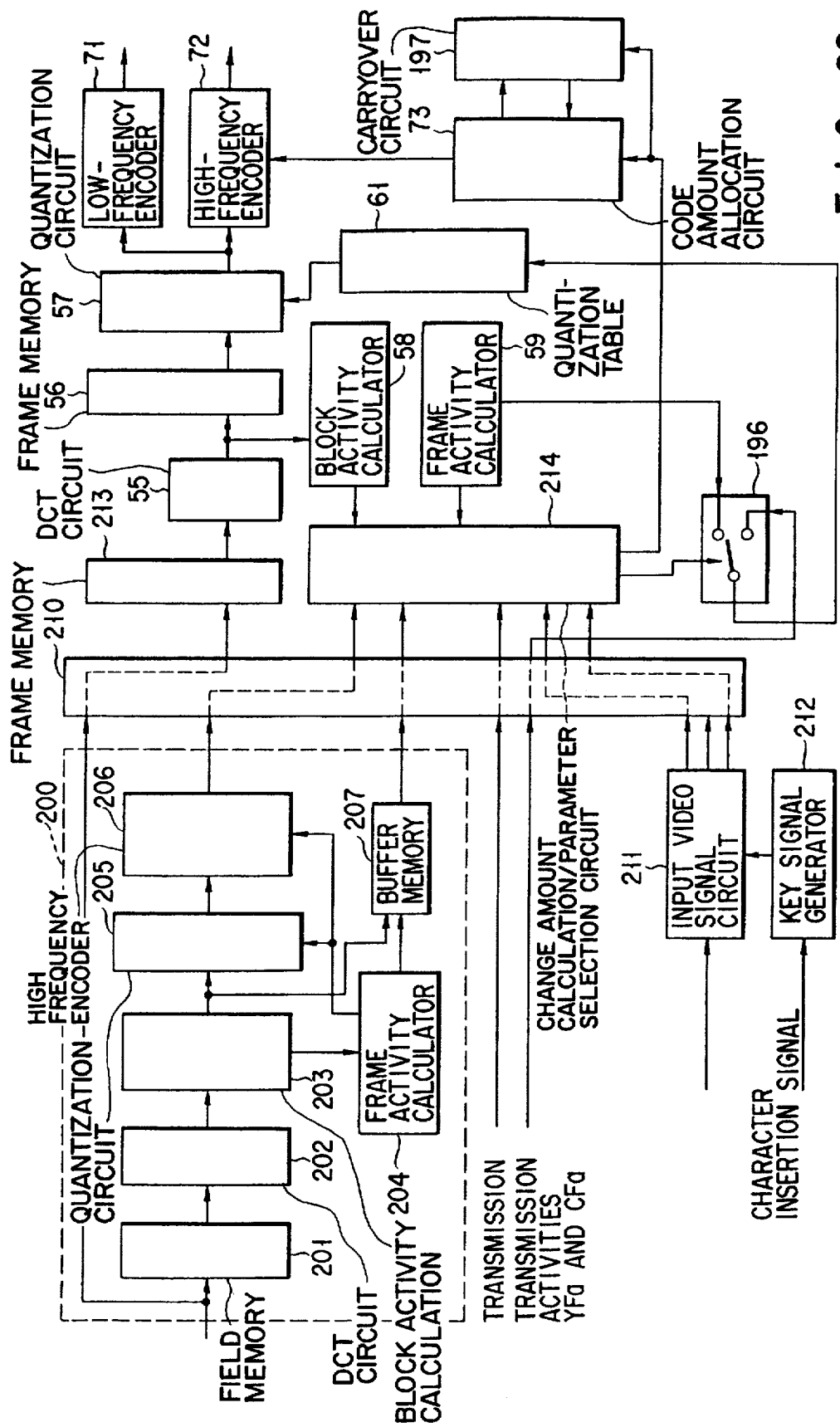
FIG. 29 is a block diagram showing still another embodiment of the present invention.
Figure 30:
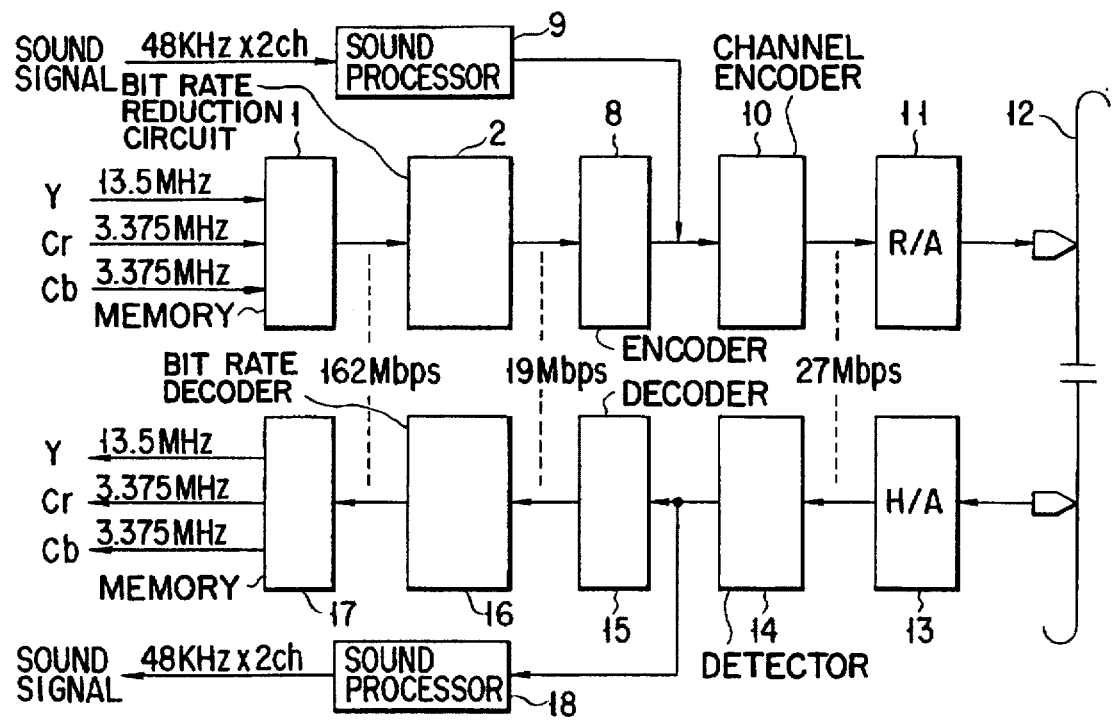
FIG. 30 is a block diagram showing a conventional high efficiency coding signal processing apparatus.
Figure 31:
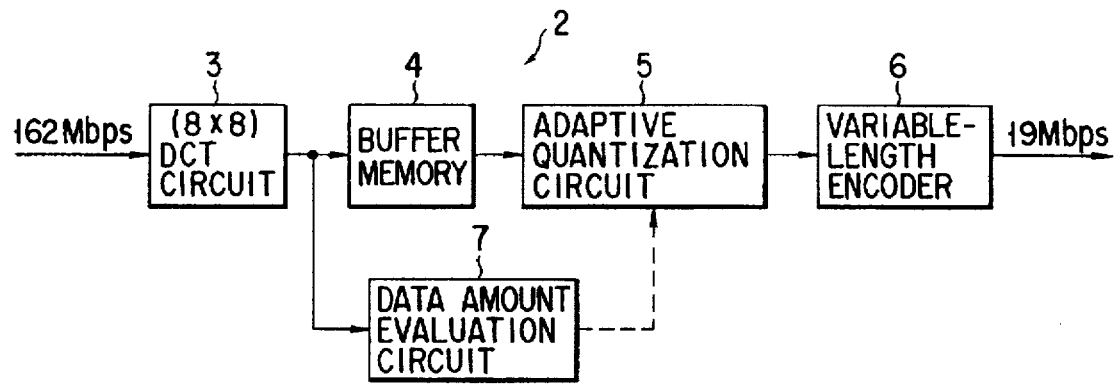
FIG. 31 is a block diagram showing the detailed arrangement of a bit rate reduction circuit in FIG. 30.
Figure 32:
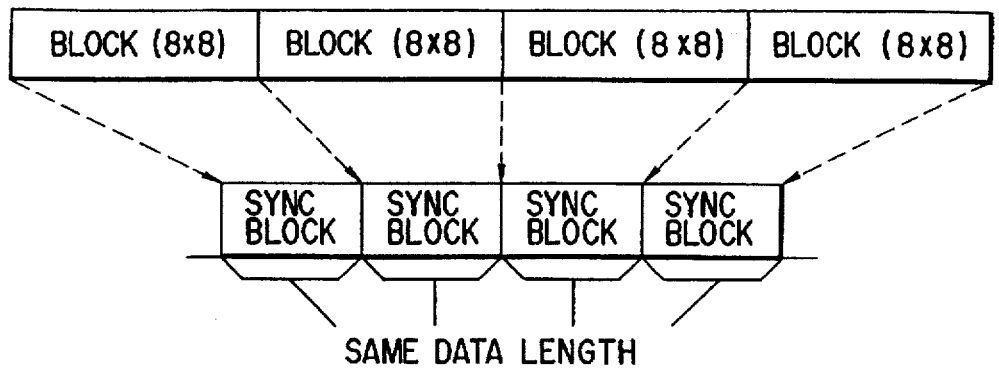
FIG. 32 is a view showing a data recording format employed in the apparatus in FIG. 30.
Figure 33:
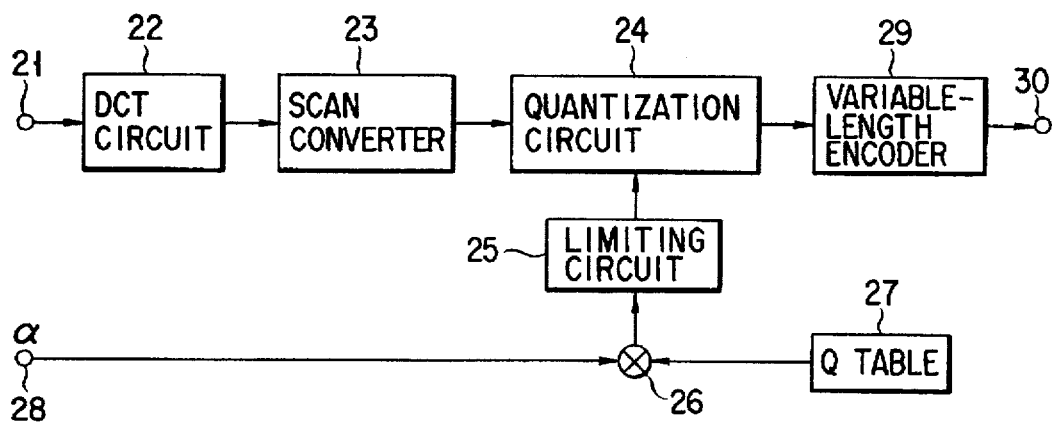
FIG. 33 is a block diagram for explaining another conventional apparatus.
Figure 34:
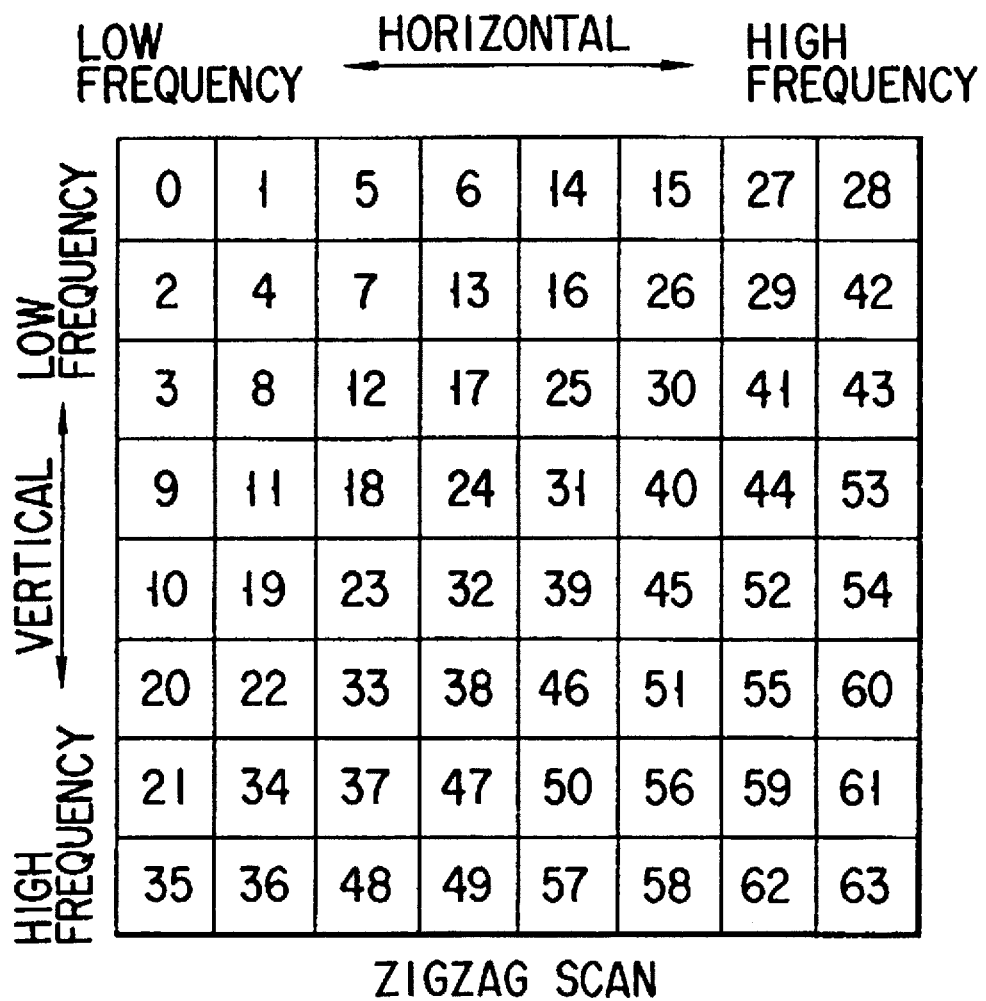
FIG. 34 is a view for explaining DCT coefficients.
Figure 35:
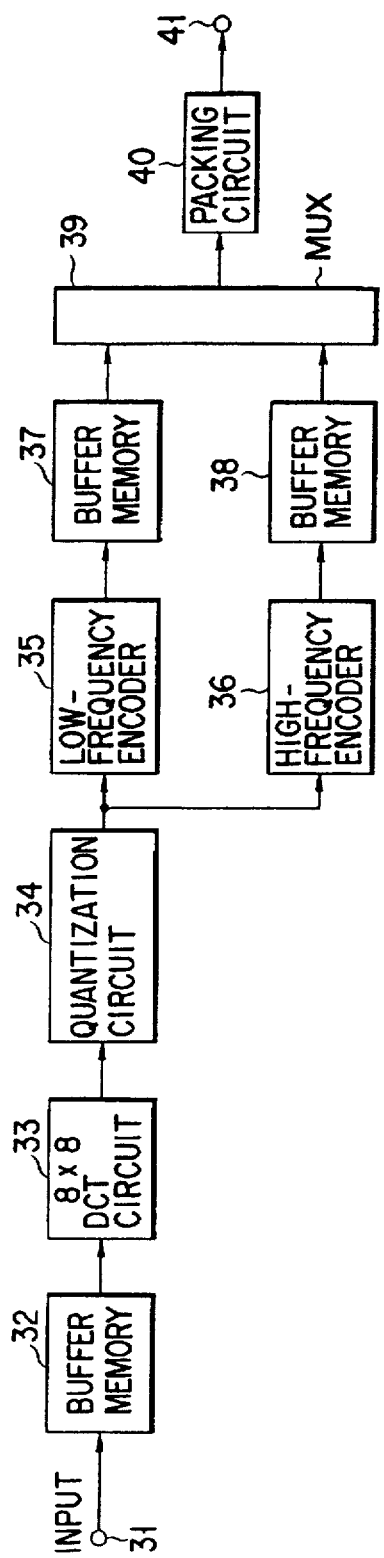
FIG. 35 is a block diagram showing still another conventional high efficiency coding signal processing apparatus.
Figure 36:
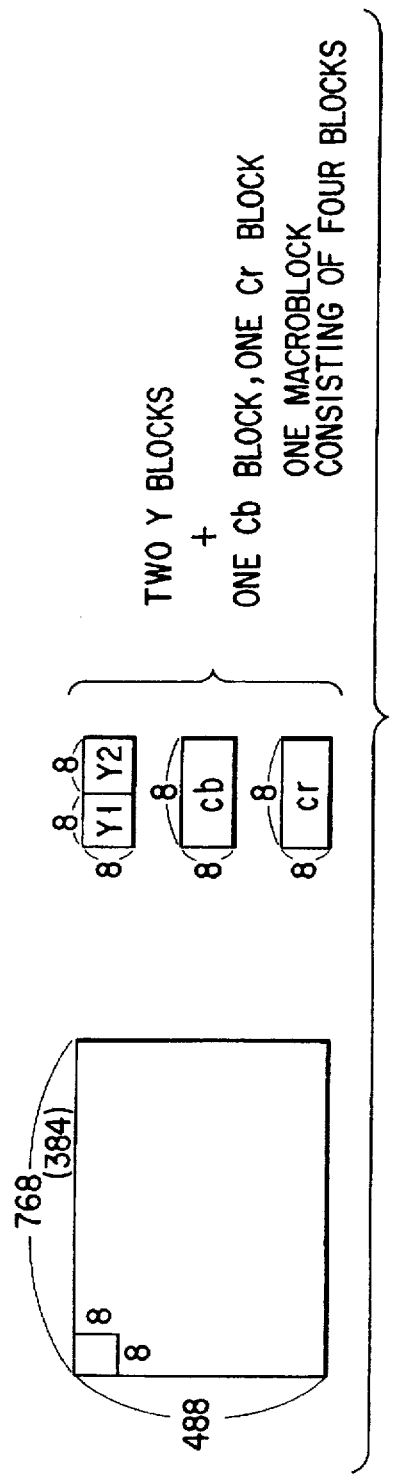
FIG. 36 is a view for explaining a macroblock.
Figure 41:
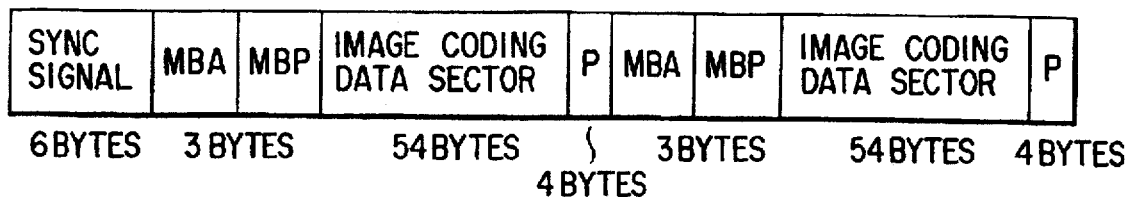
FIG. 41 is a view for explaining a conventional data format employed in the conventional apparatus in FIG. 35.
Figure 42:
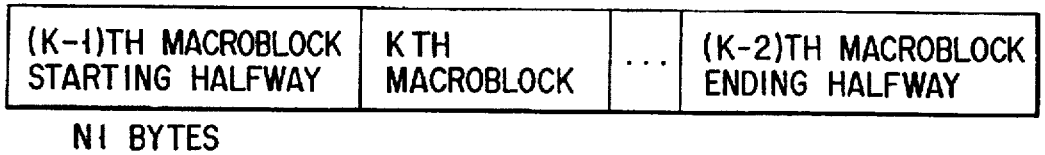
FIG. 42 is a view for explaining a conventional data format employed in the conventional apparatus in FIG. 35.
Figures 43, 44:
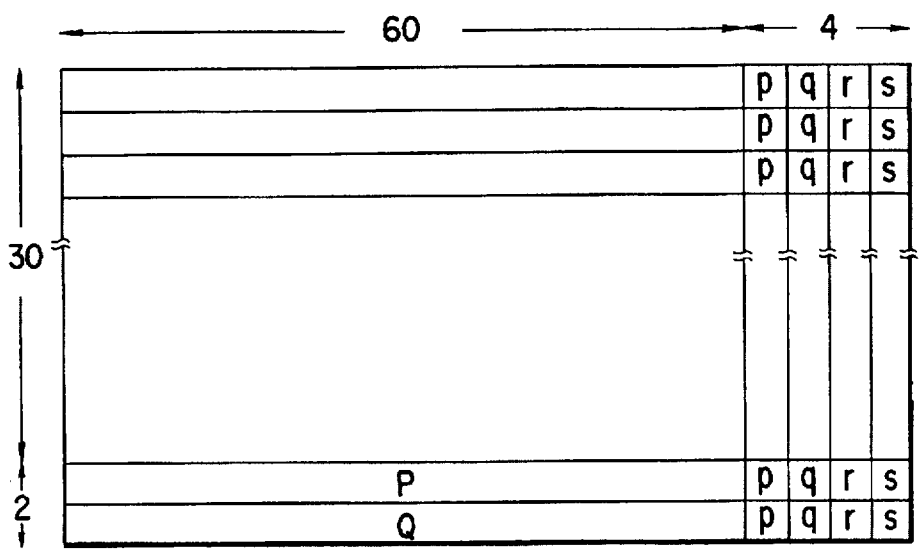
FIG. 43 is a view for explaining error correction codes.
FIG. 44 is a view for explaining error correction codes.

FIG. 29 is a block diagram showing still another embodiment of the present invention. The same reference numerals in FIG. 29 denote the same parts as in FIG. 27, and a description thereof will be omitted. Note that a color difference system is omitted from FIG. 29. This embodiment is designed to reduce a deterioration in image quality which is caused when editing, character insertion, and special effect processing are performed with respect to video signals which have undergone high efficiency coding processing.

An input video signal circuit 200 is constituted by a field memory 201, a DCT circuit 202, a block activity calculator 203, a frame activity calculator 204, a quantization circuit 205, a high-frequency encoder 206, and a buffer memory 207. The input video signal circuit 200 causes the buffer memory 207 to store the calculation block activity data and calculation frame activity data of an input video signal, respectively obtained by the block activity calculator 203 and the frame activity calculator 204, and a calculation parameter α.

Coded data and activity data from the input video signal circuit 200 are input to a special processor 210. In addition, the input video signal is directly input to the special processor 210. A transmission parameter α and transmission frame activities YFa and CFa used in the previous coding processing are also input to the special processor 210.

An input video signal circuit 211 has the same arrangement as that of the input video signal circuit 200. The input video signal circuit 211 is used to synchronously edit two types of image signals as in mixing of video signals and cutting/pasting of video signals. Similar to the input video signal circuit 200, the input video signal circuit 211 outputs an input video signal, coded data, and activity data to the special processor 210. Note that a key signal generator 212 is designed to output a character insertion signal to the special processor 210 through the input video signal circuit 211.

The special processor 210 performs special processing with respect to an input video signal and outputs the resultant signal to a DCT circuit 55 through a frame memory 213. The DCT circuit 55 performs DCT processing with respect to the input video signal and outputs the resultant signal to a frame memory 56 and a block activity calculator 58. The block activity calculator 58 outputs output block activity data, output from the DCT circuit 55, to a change amount calculation/parameter selection circuit 214 and a frame activity calculator 59. The frame activity calculator 59 outputs the output frame activity data and an output parameter a to the change amount calculation/parameter selection circuit 214 and the switch 196. The change amount calculation/parameter selection circuit 214 receives the calculation block activity data, the calculation frame activity data, and the calculation parameter α from the special processor 210. In addition, the circuit 214 receives the transmission activity data and the transmission parameter α. That is, the change amount calculation/parameter selection circuit 214 receives three types of frame activity data and the parameter α in addition to two types of block activity data.

The change amount calculation/parameter selection circuit 214 compares these frame activity data with each other, and also compares the block activity data with each other, thus determining data to be used. In this case, the circuit 214 compares the calculation data from the block activity calculator 203 and the frame activity calculator 204 with the output data from the block activity calculator 58 and the frame activity calculator 59. If it is determined on the basis of the comparison result that the calculation data should be used, transmission α and the transmission activity data (transmission data) are used in place of the calculation data. That is, calculation data is for comparison but is not used for an actual calculation of a bit allocation. The data selected by the change amount calculation/parameter selection circuit 214 are supplied to the code amount allocation circuit 73 and the carryover circuit 197. In addition, the parameter α selected by controlling the switch 196 is supplied to a quantization table 61.

An operation of the embodiment having the above-described arrangement will be described below.

Assume that calculation frame activity data is larger than output frame activity data. In this case, the change amount calculation/parameter selection circuit 214 supplies transmission frame activity data to the code amount allocation circuit 73, and at the same controls the switch 196 to supply transmission α to the quantization table 61. When the code amount allocation circuit 73 obtains a bit allocation amount on the basis of this transmission activity data, a margin (excess bits) is produced in the number of bits which can be allocated. The excess bits are supplied to the carryover circuit 197 to be stored. A uniform bit allocation amount is obtained by using the excess bits in the same manner as in the embodiment shown in FIG. 27.

Assume next that output frame activity data is larger than calculation frame activity data. That is, if it is determined on the basis of the relationship between the total number of bits used in coding processing and the frame activity data, obtained in the input video signal circuits 200 and 211, that the bit count based on the output frame activity data exceeds the usable bit count, the change amount calculation/ parameter selection circuit 214 selects and outputs the output frame activity data. With this operation, a uniform bit allocation amount can be obtained by using excess bits produced in this process.

Assume that outputs from the input video signal circuits 200 and 211 are to be synthesized with each other by the special processor 210. In this case, since the images based on two input video signals and the image based on one output video signal are totally different from each other, the change amount calculation/parameter selection circuit 214 selects the output frame activity data and the parameter α. Since the block activity data and the bit count to be used have already been calculated by the input video signal circuits 200 and 211, a deterioration in image quality can be reduced even if editing processing is performed. In addition, by using the block activity data, the parameter α can be changed in units of blocks in accordance with activity data before and after special processing.

As described above, in this embodiment, the change amount calculation/parameter selection circuit 214 compares frame activity data before and after special processing to use larger frame activity data for a calculation of a code amount allocation, thereby maintaining a uniform bit allocation amount.

As has been described above, according to the present invention, the error propagation influence can be reduced, and errors can be effectively corrected. In addition, a signal deterioration upon repetitive coding processing can be reduced.

The high efficiency coding signal processing apparatus according to the first embodiment of the present invention comprises a coding means for encoding data in units of predetermined blocks within one frame by frequency transformation, a low-frequency component coding means for encoding low-frequency components of transform coefficients from the coding means, a high-frequency component coding means for encoding high-frequency components of the transform coefficients from the coding means, a block activity calculator for obtaining block activity data of the respective blocks, a frame activity calculator for obtaining frame activity data from the block activity data, a comparison means for receiving transmission frame activity data of previous coding processing and comparing the transmission frame activity data with the frame activity data from the frame activity calculator, thereby outputting a larger one of the frame activity data, a code amount allocation circuit for determining a bit allocation amount of the high-frequency component coding means on the basis of the frame activity data from the comparison means and the block activity data, and a carryover circuit for, when the bit allocation amount set by the code amount allocation circuit does not reach a total bit count allocated for coding, holding the bit allocation amount as excess bits to allow the excess bits to be used for a calculation of a bit allocation amount for a next block.

According to this arrangement, the comparison means compares the frame activity data used for the previous coding processing with the frame activity data obtained by the frame activity calculator in the current coding processing, and outputs larger data to the code amount allocation circuit. The code amount allocation circuit determines the bit allocation amount of the high-frequency coding means on the basis of the block activity data obtained by the block activity calculator and the frame activity data from the comparison means. Therefore, the bit allocation amount of the code amount allocation circuit is smaller than the total bit count allocated for coding processing. The carryover circuit holds these excess bits and uses them for a calculation of a bit allocation amount for the next block, thereby maintaining a uniform bit allocation amount of the code amount allocation circuit. With this processing, a signal deterioration upon repetitive coding processing can be prevented.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A high efficiency coding signal processing apparatus comprising:

data compressing means for frequency transforming data which represents a frame of information and outputting transform coefficients, indicative thereof, the transform coefficients including low-frequency components and high-frequency components, the data comprising a predetermined number of blocks, each block comprising a predetermined number of pixels;

low-frequency component coding means for receiving the low-frequency components of the transform coefficients outputted by the data compressing means, and for outputting low-frequency data by encoding the low-frequency components;

high-frequency component coding means for receiving the high-frequency components of the transform coefficients outputted by the data compressing means, and for outputting high-frequency data by encoding the high-frequency components;

first transmission sequence packet means for receiving the low-frequency data outputted by the low-frequency component coding means, for performing predetermined sequencing with respect to the low-frequency data at a first predetermined period including at least two blocks thereof, and for outputting sequenced low-frequency data;

second transmission sequence packet means for receiving the high-frequency data outputted by the high-frequency component coding means, for performing predetermined sequencing with respect to the high-frequency data at a second predetermined period so that block numbers of the high-frequency data correspond to block numbers of the low-frequency data sequenced by said first transmission sequence packet means, and for outputting sequenced high frequency data; and transmitting means for separately transmitting the sequenced low-frequency data output by the first transmission sequence packet means and the sequenced high-frequency data output by the second transmission sequence packet means, so as to arrange all of the sequenced high-frequency data after all of the sequenced low-frequency data, thereby permitting the data to be determined based on the sequenced low-frequency data, even if an error occurs within the sequenced high-frequency data.

2. An apparatus according to claim 1, wherein said second transmission sequence packet means includes means for separately arranging Huffman codes and non-zero coefficient data codes included in the high-frequency components.

3. An apparatus according to claim 1, wherein:

said first transmission sequence packet means sequences the low-frequency data at the first predetermined period so as to include two blocks of luminance signals and two blocks of color difference signals within a first area of the data;

said second transmission sequence packet means sequences the high-frequency data at the second predetermined period so as to include two blocks of luminance signals and two blocks of color difference signals within a second area of the data; and said transmitting means arranges the low-frequency data and the high frequency data in the following order:
   the two blocks of luminance signals of the low-frequency data, the two blocks of color difference signals of the low-frequency data, the two blocks of luminance signals of the high-frequency data, and the two blocks of color difference signals of the high-frequency data.

4. A high efficiency coding signal processing apparatus comprising:

decoding means for decoding variable-length data, the variable-length data being encoded in units of predetermined blocks within a frame;

a decoding error detector for detecting an error block within the decoded data;

holding means for holding the decoded data; and data length estimation means for receiving, from the holding means, a selected one of the blocks of the decoded data, for estimating, based upon a data length of the selected one of the blocks, a data length of the error block, and for designating a starting position for the decoding means to decode a subsequent block, the starting position being based upon the estimated data length of the error block, the selected block being the block which directly precedes the error block.

* * * * *